US009902920B2

(12) United States Patent
Wu et al.

(10) Patent No.: US 9,902,920 B2
(45) Date of Patent: Feb. 27, 2018

(54) POLYSILOXANES AS FRAGRANCE DELIVERY SYSTEMS IN FINE PERFUMERY

(71) Applicant: Firmenich SA, Geneva (CH)

(72) Inventors: Yongtao Wu, Shanghai (CN); Damien Berthier, Geneva (CH)

(73) Assignee: Firmenich SA, Geneva (CH)

( * ) Notice: Subject to any disclaimer, the term of this patent is extended or adjusted under 35 U.S.C. 154(b) by 0 days.

(21) Appl. No.: 15/534,580

(22) PCT Filed: Dec. 7, 2015

(86) PCT No.: PCT/EP2015/078845
§ 371 (c)(1),
(2) Date: Jun. 9, 2017

(87) PCT Pub. No.: WO2016/091815
PCT Pub. Date: Jun. 16, 2016

(65) Prior Publication Data
US 2017/0335234 A1    Nov. 23, 2017

(30) Foreign Application Priority Data
Dec. 10, 2014 (EP) .................................... 14197092

(51) Int. Cl.
| C11B 9/00 | (2006.01) |
| C08K 5/07 | (2006.01) |
| C08G 77/28 | (2006.01) |

(52) U.S. Cl.
CPC ............ *C11B 9/0015* (2013.01); *C08G 77/28* (2013.01); *C08K 5/07* (2013.01); *C08K 2201/007* (2013.01)

(58) Field of Classification Search
CPC .................................................... C11B 9/0015
See application file for complete search history.

(56) References Cited

U.S. PATENT DOCUMENTS

| 4,137,180 A | 1/1979 | Naik et al. |
| 4,396,670 A | 8/1983 | Sinclair |
| 5,085,858 A | 2/1992 | Halloran et al. |
| 5,236,615 A | 8/1993 | Trinh et al. |
| 2006/0263898 A1* | 11/2006 | Paget .................... A61K 8/25 436/166 |
| 2007/0142552 A1 | 6/2007 | Silvi et al. |

FOREIGN PATENT DOCUMENTS

| EP | 799885 A1 | 10/1997 |
| WO | WO1997034986 A1 | 9/1997 |
| WO | WO2001041915 A1 | 6/2001 |
| WO | WO2003049666 A2 | 6/2003 |
| WO | WO2008044178 A1 | 4/2008 |
| WO | WO2012113746 A1 | 8/2012 |
| WO | WO2014202591 A1 | 12/2014 |

OTHER PUBLICATIONS

Ullmann's Encyclopedia of Industrial Chemistry, Chapter 2, 2012, vol. 20, Wiley-VCH, Weinheim, p. 393-449.
Ullmann's Encyclopedia of Industrial Chemistry, Chapter 3, 2012, vol. 20, Wiley-VCH, Weinheim, p. 451-485.
Ullmann's Encyclopedia of Industrial Chemistry, Chapter 4, 2012, vol. 20, Wiley-VCH, Weinheim, p. 487-520.
Ullmann's Encyclopedia of Industrial Chemistry, Chapter 5, 2012, vol. 20, Wiley-VCH, Weinheim, p. 521-540.
International Preliminary Report on Patentability, Appl. No. PCT/EP2015/078845, dated Jun. 13, 2017.
International Search Report and Written Opinion, application PCT/EP2015/078845 dated Jan. 22, 2016.
Bône et al., "Microencapsulated Fragrances in Melamine Formaldehyde Resins", Chimia, 2011, vol. 65, n° 3, pp. 177-181.
Dietrich et al., "Amino resin microcapsules I", Acta Polymerica, 1989, vol. 40, n° 4, pp. 243-251.
Dietrich et al., "Amino resin microcapsules II", Acta Polymerica, 1989, vol. 40, n° 5, pp. 325-331.
Dietrich et al., "Amino resin microcapsules III", Acta Polymerica, 1989, vol. 40, n° 11, pp. 683-690.
Dietrich et al., "Amino resin microcapsules IV", Acta Polymerica, 1990, vol. 41, n° 2, pp. 91-95.
Herrmann, "Controlled Release of Volatiles under Mild Reaction Conditions: From Nature to Everyday Products", Angew.Chem. Int. Ed., 2007, vol. 46, pp. 5836-5863.
Lee et al., "Microencapsulation of fragrant oil via in situ polymerization", J. Microencapsulation, 2002, vol. 19, n° 5, pp. 559-569.
Ullmann's Encyclopedia of Industrial Chemistry, 7th Edition, 2012, vol. 32, p. 675-712.
Ullmann's Encyclopedia of Industrial Chemistry, Chapter 1, 2012, vol. 20, Wiley-VCH, Weinheim, p. 355-391.

* cited by examiner

*Primary Examiner* — Lanee Reuther
(74) *Attorney, Agent, or Firm* — Winston & Strawn LLP

(57) ABSTRACT

The present invention relates to the field of perfumery. More particularly, it concerns polymers derived from siloxane derivatives and comprising at least one β-thio carbonyl moiety capable of liberating an active molecule such as, for example, an α,β-unsaturated ketone or aldehyde. The present invention concerns also the use of polymers in perfumery as part of a perfuming or malodor counteracting composition as well as the perfuming compositions or perfumed articles comprising the invention's compounds.

17 Claims, No Drawings

POLYSILOXANES AS FRAGRANCE DELIVERY SYSTEMS IN FINE PERFUMERY

RELATED APPLICATIONS

This application is a national stage application under 35 U.S.C. § 371 filing of International Patent Application PCT/EP2015/078845, filed Dec. 7, 2015, which claims the benefit of European patent application n° 14197092.1 filed. Dec. 10, 2014.

TECHNICAL FIELD

This invention relates to polysiloxane conjugates in the field of perfumery. More particularly, it concerns polymers derived from siloxane derivatives and comprising at least one β-thio carbonyl moiety capable of liberating an active molecule such as, for example, an α,β-unsaturated ketone or aldehyde. The present invention concerns also the use of polymers or co-polymers in perfumery as part of a perfuming or malodor counteracting composition, as well as the perfuming compositions or perfumed articles comprising the invention's compounds.

PRIOR ART

The perfume industry has a particular interest for derivatives which are capable of prolonging the effect of active ingredients over a certain period of time, for example in order to overcome the problems encountered when using perfuming ingredients which are too volatile or have a poor substantivity. In particular, the industry is interested in derivatives capable of providing an improved olfactive performance. Said improvement can be in time, in intensity or in the effective amount of active compound released.

As typical examples of prior art systems for prolonging the effect of active ingredients over a certain period of time, one may cite the following:

WO 03/049666 describes a class of compounds capable of prolonging the effect of active ingredients. Among these compounds there are mentioned polymers, citing as specific examples a few styrene co-polymers. However, although the performance described in the examples for several monomeric derivatives is quite good, the performance of the polymers is relatively modest (see Examples 6 and 7 of the application) and in any case the performance is effectively perceived over periods of time, typically during several days, which is ideal for detergents and softeners, but not for applications on skin, where an effective release over several hours would be needed. There is therefore still a need to improve the release properties of polymer-based ingredients capable of prolonging the effect of active ingredients.

The patent application WO 2008/044178 deals with co-polymers, derived from a maleic anhydride derivative and an ethylenic derivative, comprising at least one β-thio carbonyl moiety capable of liberating an active molecule such as, for example, an α,β-unsaturated ketone, aldehyde or carboxylic ester. These polymers are quite different from the present ones and anyway show a prolonging effect for fragrance release on the same timescale as those described in WO 03/049666.

In fact all the systems known for prolonging the effect of active ingredients over a certain period of time, and being based on a chemical reaction, are known to be effective only on a time scale of several days but not within a few hours.

The aim of the present invention is to provide alternative polymeric materials capable to significantly perform, or prolonging the effect of active ingredients within a few hours after application.

The invention's co-polymers are believed to have never been specifically disclosed or suggested in the prior art, nor their particular performances in the field of perfume release.

DESCRIPTION OF THE INVENTION

We have now surprisingly discovered the existence of particular polymers derived from siloxane derivatives and comprising at least one β-thio carbonyl moiety capable of liberating an active molecule, namely an enal or an enone, and having a superior performance when compared with the free active molecule and superior performance when compared with prior art polymers for application related to fine perfumery. As "active molecule" we mean here any molecule capable of bringing an odor benefit or effect into its surrounding environment, and in particular an odoriferous molecule, i.e. a perfuming ingredient, such as an α,β-unsaturated ketone or aldehyde.

It is understood that in the present invention the term "polymers" includes homo-polymers, i.e. obtained by the polymerization of one type of monomers (without considering the terminal groups), as well as co-polymers, i.e. obtained by the polymerization of two or more types of monomers. It is understood that in the present invention the term "polymers" includes also oligomers (such as trimers, tetramers or higher oligomers).

The present invention's polymers can be used as perfuming or malodor counteracting ingredients.

A first object of the present invention concerns a polymer, capable of releasing in a controlled manner an odoriferous α,β-unsaturated ketone or aldehyde, and comprising at least one repeating unit of formula

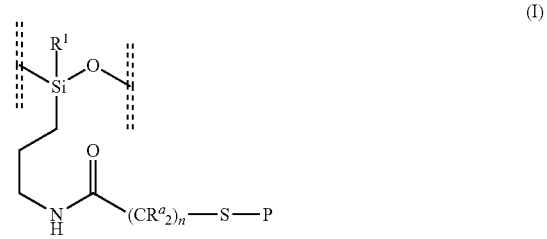

(I)

wherein the double hatched lines indicate the bonding to another repeating unit and
$R^1$ represents a $C_1$ to $C_{16}$ hydrocarbon group;
P represents a group susceptible of generating a perfuming α,β-unsaturated ketone or aldehyde and is represented by formula

(II)

in which the wavy line indicates the location of the bond between said P and the sulfur atom;

$R^2$ represents a hydrogen atom, a $C_1$ to $C_{15}$ linear, cyclic or branched alkyl, alkenyl or alkadienyl radical, optionally substituted by one to four $C_1$ to $C_4$ alkyl groups; and $R^3$, $R^4$ and $R^5$, independently of each other, represent a hydrogen atom, a $C_6$ to $C_{10}$ aromatic ring or a $C_1$ to $C_{15}$ linear, cyclic or branched alkyl, alkenyl or alkadienyl radical, possibly substituted by $C_1$ to $C_4$ alkyl groups; or two, or three, of the groups $R^1$ to $R^4$ are bound together to form a saturated or unsaturated ring having 5 to 20 carbon atoms and, including the carbon atom to which said $R^2$, $R^3$, $R^4$ or $R^5$ groups are bound, this ring being optionally substituted by one or two $C_1$ to $C_8$ linear, branched or cyclic alkyl or alkenyl groups;

each $R^a$, independently from each other represents, a hydrogen atom or a methyl group; and n represents 1 or 2.

It is understood that by " . . . hydrocarbon group . . . " it is meant that said group is consisting of hydrogen and carbon atoms and can be in the form of a linear, branched or cyclic, aromatic, alkyl, alkenyl, or alkynyl group, e.g., a linear alkyl group, or can also be in the form of a mixture of said types of groups, e.g. a specific group may comprise a linear alkyl, a branched alkenyl (e.g. having one or more carbon-carbon double bonds), a (poly)cyclic alkyl and an aryl moiety, unless a specific limitation to only one type is mentioned. Similarly, in all the embodiments of the invention, when a group is mentioned as being in the form of more than one type of topology (e.g. linear, cyclic or branched) and/or being saturated or unsaturated (e.g. alkyl, aromatic or alkenyl), it is meant also a group which may comprise moieties having any one of said topologies or being saturated or unsaturated, as explained above. Similarly, in all the embodiments of the invention, when a group is mentioned as being in the form of one type of saturation or unsaturation, (e.g. alkyl), it is meant that said group can be in any type of topology (e.g. linear, cyclic or branched) or having several moieties with various topologies.

As "perfuming α,β-unsaturated ketone or aldehyde", expression used in the definition of P, we mean here an α,β-unsaturated ketone or aldehyde which is recognized by a person skilled in the art as being used in perfumery as perfuming ingredient. By "perfuming ingredient" it is meant here a compound, which is used in a perfuming preparation or a composition to impart a hedonic effect. In other words such perfuming ingredient, to be considered as being a perfuming one, must be recognized by a person skilled in the art as being able to impart or modify in a positive or pleasant way the odor of a composition, and not just as having an odor.

In general, said odoriferous α,β-unsaturated ketone or aldehyde is a compound having from 8 to 20 carbon atoms, or even more, preferably between 10 and 15 carbon atoms.

According to any embodiment of the invention, P may represent a group of the formulae (P-1) to (P-13), in the form of any one of its isomers:

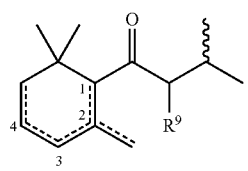
(P-1)

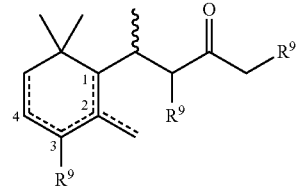
(P-2)

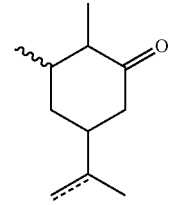
(P-3)

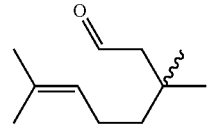
(P-4)

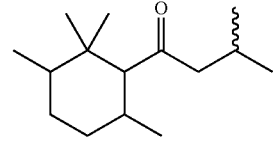
(P-5)

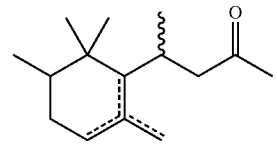
(P-6)

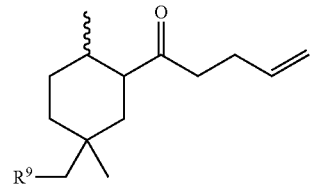
(P-7)

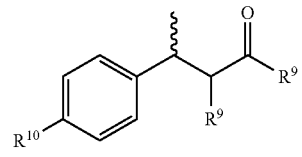
(P-8)

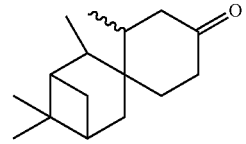
(P-9)

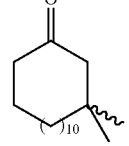
(P-10)

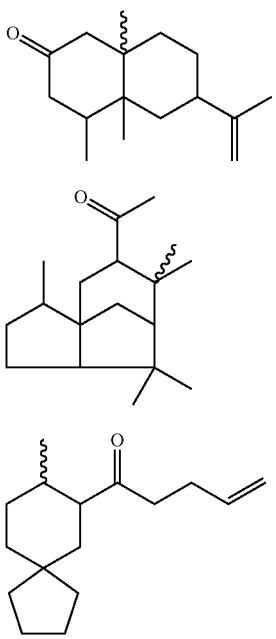

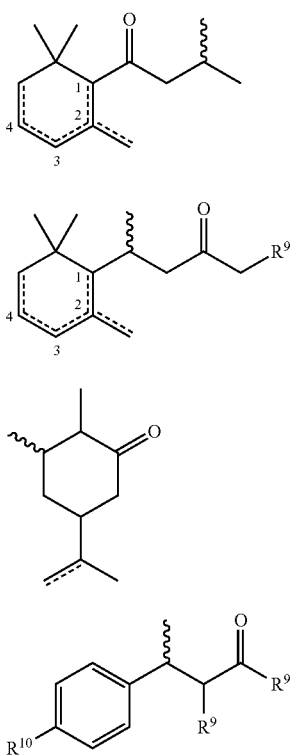

in which formulae the wavy lines have the meaning indicated above and the dotted lines represent a single or double bond, $R^9$ being a hydrogen atom or a methyl group and $R^{10}$ representing a hydrogen atom, a hydroxy or methoxy group or a $C_1$-$C_4$ linear or branched alkyl group.

According to any embodiment of the invention, P may represent a radical of the formula

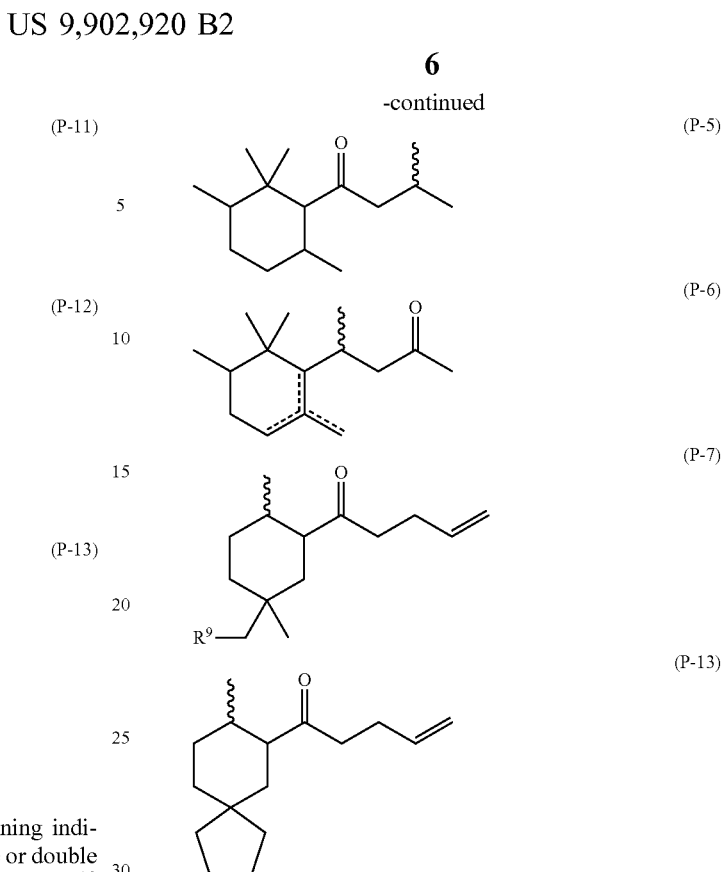

wherein wavy lines, dotted lines, $R^9$ and $R^{10}$ have the meaning indicated above.

According to any embodiment of the invention, P may represent a radical of the formula (P-1), (P-2), (P-1)', (P-2)', (P-3), (P-7), (P-8) or (P-13) as defined above. Even more particularly P may represent a compound of formula (P-1), (P-2) or (P-3).

According to any embodiment of the invention, said $(CR^a{}_2)_n$ group represents a group selected amongst $CH_2$, CHMe, $CMe_2$, $CH_2CH_2$, CHMeCHMe and $CHMeCH_2$.

According to any embodiment of the invention, $R^1$ represents a $C_1$ to $C_{10}$ linear, cyclic or branched alkyl, alkenyl or alkadienyl radical, optionally substituted by one or two $C_{1-4}$ alkyl groups or a $C_{6-12}$ aromatic ring.

According to any embodiment of the invention, said $R^1$ represents a $C_1$ to $C_4$ linear or branched alkyl group. In particular $R^1$ may represent a methyl group.

According to any embodiment of the invention, the polymers can be co-polymers of the repeating unit (I) and other repeating units. Said co-polymers may be in the form of a random co-polymer or of a block co-polymer. According to any embodiment of the invention, the co-polymer is preferentially of the random, or statistic, type.

According to any embodiment of the invention, said polymer is a homo-polymer or alternatively it is a co-polymer.

According to any embodiment of the invention, the co-polymer comprises repeating units (I), and siloxane repeating units other that unit (I), without accounting for the terminal groups. In particular said co-polymer may comprise essentially (i.e. more than 90%, 95% or even 100% molar percent) siloxane repeating units. Polymers comprising 100% molar percent of siloxane repeating units, without accounting for the terminal groups, are preferred.

Furthermore, it is also useful to mention that in said invention's co-polymers the total amount of the repeating unit (I), relative to the total amount of repeating units and without accounting the terminal groups, (hereinafter (I)/(Tot)) and expressed in molar percent) can be comprised between 5% and 100%, and in particular between 30% and 100%, or even between 45% and 95% or 100%/o.

As mentioned above, the invention's co-polymers may comprise at least one other repeating unit, preferably another siloxane. Said other repeating units can be of a specific type or comprise several types (e.g. 2 or 3 different types). According to any embodiment of the invention, said other repeating units can be of the formulae (III) or (IV)

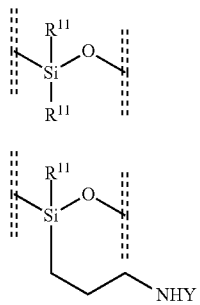

(III)

(IV)

wherein the double hatched lines and $R^1$ have the same meaning as described for formula (I);
each $R^{11}$ group represents independently of each other a $C_6$ to $C_{12}$ aromatic ring or a $C_1$ to $C_{18}$ linear, cyclic or branched alkyl group, or a $C_1$ to $C_6$ linear, cyclic or branched alkyloxy group; and
Y represents a hydrogen atom or an group of formula —(C=O)(CR$^a_2$)$_n$SH, wherein $R^a$ and n have the same meaning as indicated above.

According to any embodiment of the invention, said other repeating units can be of formula (IV')

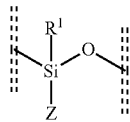

(IV')

wherein the double hatched lines and $R^1$ have the same meaning as described for formula (I);
Z represents a group of formula —(CH$_2$)$_3$O-PG or —O—(CH$_2$)$_3$O-PG, wherein PG represents a polyglycol unit comprising between 2 and 100 glycol units, in particular said glycol unit can be of formula —CH$_2$CH$_2$O— or —CH$_2$CHMeO—.

According to any embodiment of the invention, said PG represents a polyglycol unit comprising between 5 and 50 glycol units.

According to any embodiment of the invention, by "$C_6$ to $C_{12}$ aromatic group or ring" it is meant a phenyl or naphthyl group, optionally substituted with other groups (such as alkyl groups) allowing to obtain the desired number of carbon atoms.

According to any embodiment of the invention, each of said $R^{11}$ group represents, independently of each other, a phenyl group or a $C_1$ to $C_3$ linear or branched alkyl group, or a $C_{16}$ to $C_{18}$ linear alkyl group. According to any embodiment of the invention, at least one of said $R^{11}$ groups is a methyl group. According to any embodiment of the invention, each $R^{11}$ group is a methyl group or alternatively one is a methyl group and the other is a $C_{16}$ to $C_{18}$ linear alkyl group.

According to any embodiment of the invention, said Y represents a group of formula —(C=O)(CR$^a_2$)$_n$SH, wherein $R^a$ and n have the same meaning as indicated above.

According to any embodiment of the invention, the co-polymer of the invention can also be characterized by a molar ratio of the repeating units (I)/[(III)+(IV)+(IV')] comprised between 99/1 and 20/80, or comprised between 90/10 and 40/60, or even between 85/15 and 45/55.

According to any embodiment of the invention, the polymer of the invention can also be, or may further be, characterized by being not cross-linked, and in particular by the siloxane skeleton not being cross-linked. According to any embodiment of the invention, said invention's polymer can be characterized by comprising, in addition to the units (I), only siloxane units of the (M) or (D) type, and not having (T) or (Q) type siloxane units (Silicones in Ullmann's Encyclopedia of Industrial Chemistry, 7$^{th}$ Edition, 2012, vol. 32, p. 675-712). For the sake of clarity, by the expression "(M), (D), (T) or (Q) type siloxane units" it is meant the usual meaning of the art, i.e. units of formula:

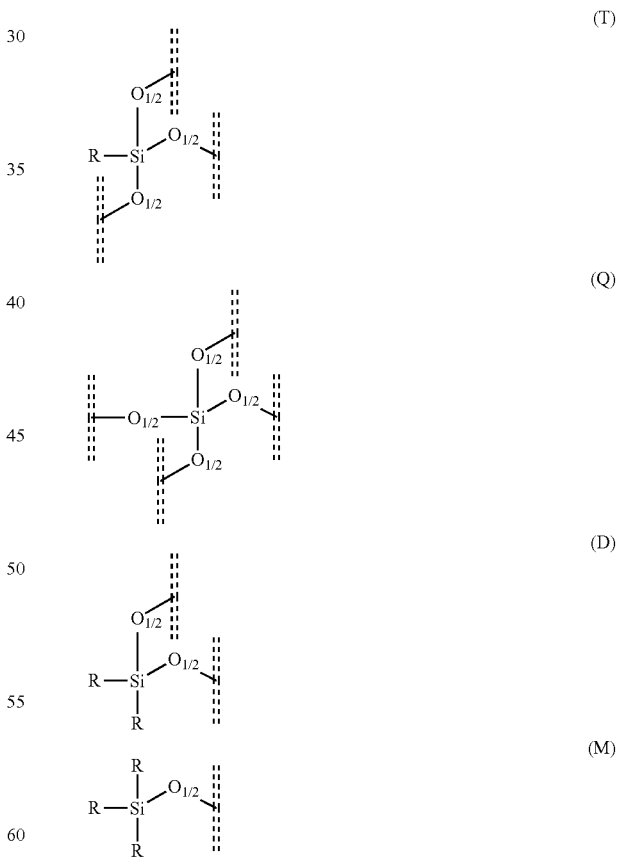

wherein, in the present context, said (D) and (M) units represent groups of formula (III), (IV), (IV') and/or (IV") as defined in the description;
so that a poly-siloxane based only on units (I), as well as of (D) and (M) units is basically a linear polymer.

In particular according to any embodiment of the invention, said polymer is linear and comprises only siloxane units of formula (III), (IV) and/or (IV'), and of formula (I), as defined in the description.

According to any embodiment of the invention, said polymer can be characterized by a weight average molecular weight ($M_w$) comprised in the range between 1000 Da and 8000 Da, preferably between 1400 or 2000 and 4000 Da.

According to any embodiment of the invention, said polymer can be characterized by a Hansen solubility parameter (obtained according to Hansen Solubility Parameters in Practice HSPiP software 3rd edition 3.1.25 (2013)) comprised in the range between 14.3 and 17.0 $MPa^{0.5}$.

According to any embodiment of the invention, a particular type of polymers of the invention are the ones obtainable by a process comprising the following steps:

I) reacting together, at a temperature comprised between 20° C. and 95° C., preferably between 60° C. and 95° C.:
   a monomer of formula

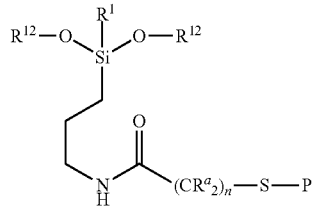

(i)

wherein $R^1$, $R^a$, n and P have the same meaning as in formula (I) and $R^{12}$ represents a $C_{1-3}$ alkyl group, in particular a methyl or ethyl group;

optionally monomers of formulae (ii) and/or (iii) and/or (iv')

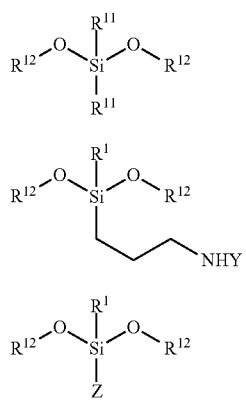

(ii)

(iii)

(iv')

wherein $R^1$, $R^{11}$, $R^a$, n, Y, Z and $R^{12}$ have the same meaning as indicated above;
optionally a monomer of formulae (iv), (v), or (vi)

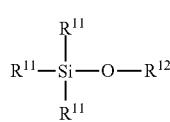

(iv)

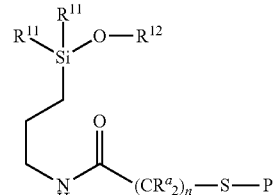

(v)

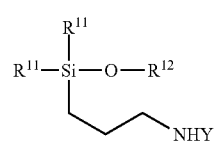

(vi)

wherein $R^{11}$, $R^{12}$, $R^a$, n, X, P and Y have the same meaning as indicated above;
and between 0.5 and 1.1 molar amounts of water with respect to the O—$R^{12}$ groups; and
optionally, but preferably, an amount of a base;

II) optionally, evaporating the alcohol $R^{12}$—OH obtained after polymerization.

According to any embodiment of the invention, and alternatively, the above process may further comprise a final step of neutralization of the base (when added), and such neutralization may be achieved either by addition of a suitable acid or by repeated washing of the polymer obtained.

According to any embodiment of the invention, and alternatively, the monomer (i) can be replaced by a monomer of formula

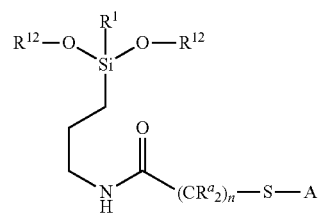

(i')

wherein $R^1$, $R^a$, n, and $R^{12}$ have the same meaning as indicated above and A represents a hydrogen atom or an alkali metal atom;

and, before or after the optional step II), by reacting the polymers so obtained in the previous step with an odoriferous compound of formula

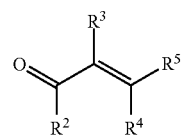

(P')

wherein the configuration of the carbon-carbon double bond can be of the (E) or (Z) type and the symbols $R^2$, $R^3$, $R^4$ and $R^5$ have the meaning indicated in formula (II), and under conditions allowing the formation of the repeating unit (I).

According to any embodiment of the invention, and alternatively, the monomer (i) or (I') can be replaced by a monomer of formula

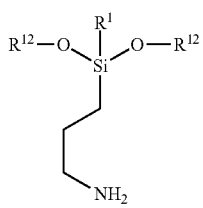

(i″)

wherein $R^1$ and $R^{12}$ have the same meaning as indicated above;

and, before or after the optional step II), by reacting the polymers so obtained in the previous step with a compound of formula P—S—$(CR^a_2)_n$COX   (P‴)

wherein X represents a OH group, a F, Cl or Br atom, a $OCOOR^{15}$ group or a $OR^{15}$ group, $R^{15}$ representing a $C_{1-4}$ alkyl group, and the symbols P, $R^a$ and n have the meaning indicated in formula (I), and under conditions allowing the formation of the repeating unit (I).

According to any embodiment of the invention, the amount of water used in the above process can be comprised between 0.7 and 1.0 molar amounts of water with respect to the O—$R^{12}$ groups.

For the sake of clarity, by the expression "an amount of a base" or the similar, it is here meant that the reaction is performed in a basic pH, in general comprised above 10, or 12 or even 14, and that the base can be any base, and in particular a hydroxide ion, such as DBU (i.e. 1,8-diazabicyclo(5.4.0)undec-7-ene), NaOH, KOH, triethylamine, N,N-diisopropylethylamine or triethanolamine.

The monomers of formulae (iv), (v), and (vi) are meant to be possible end-chain units. Indeed, according to any embodiment of the invention, said polymer has terminal groups, which can be of various nature, depending on the manner of the preparation of the polymer.

According to any embodiment of the invention, said terminal group can be a $Si(OH)_3$, $Si(OR^{12})(R^{11})_2$, $Si(OR^{12})_3$ or $Si(R^{11})_3$ group. In particular said terminal group is a $Si(OH)_3$, $Si(OR^{12})(R^{11})_2$ or $Si(Me)_3$ group.

Said monomer (i) can be obtained by [1,4]-addition of an appropriate compound of formula (i') (wherein A represents a hydrogen atom or an alkali metal atom) to an odoriferous $\alpha,\beta$-unsaturated ketone or aldehyde of formula (P').

The other monomers are either commercially available or can be obtained following standard procedures well known by a person skilled in the art.

According to any embodiment of the invention, the polymer of the invention is a linear co-polymer wherein the molar ratio of the repeating units (I)/[(III)+(IV)] is comprised between 85/15 and 45/55, and in formula (I) P is defined hereinabove (in particular as defined in formulae (P-1) to (P-13);

$R^1$ is a methyl group;

$R^a$ and n are as defined herein above; and said polymer having a weight average molecular weight ($M_w$) comprised in the range between 1000 Da and 8000 Da, preferably between 1400 or 2000 and 4000 Da;

terminal groups of formula —$Si(OH)_3$, —$Si(OR^{13})(R^{14})$ or —$Si(R^{14})_3$ wherein each $R^{13}$ represents independently from each other a hydrogen atom or a $R^{12}$ group as defined above; and each $R^{14}$ represents independently from each other a $R^1$ or a $R^{11}$ group as defined above.

Owing to their particular chemical structure the invention's polymers are capable of releasing, via a decomposition reaction, a residue and an odoriferous molecule such as, for example, an $\alpha,\beta$-unsaturated ketone or aldehyde of formula (P').

It is not possible to provide an exhaustive list of compounds of formula (P'), which can be used in the synthesis of the compound (I) and subsequently be released. However, the following can be named as preferred examples: alpha-damascone, beta-damascone, gamma-damascone, delta-damascone, alpha-ionone, beta-ionone, gamma-ionone, delta-ionone, beta-damascenone, 3-methyl-5-propyl-2-cyclohexen-1-one, 1-(3,3- or 5,5-dimethyl-1-cyclohexen-1-yl)-4-penten-1-one (Neobutenone®, origin: FirmenichSA), 1-(3-ethyl-3-methyl-1-cyclohexen-1-yl)-4-penten-1-one, 1-(5-ethyl-5-methyl-1-cyclohexen-1-yl)-4-penten-1-one, 1-(spiro[4.5]dec-6- or 7-en-7-yl)pent-4-en-1-one, 2-methyl-5-(prop-1-en-2-yl)cyclohex-2-enone (carvone), 8- or 10-methyl-alpha-ionone, 2-octenal, 1-(2,2,3,6-tetramethyl-1-cyclohexyl)-2-buten-1-one, 4-(2,2,3,6-tetramethyl-1-cyclohexyl)-3-buten-2-one, 2-cyclopentadecen-1-one, 4,4a-dimethyl-6-(prop-1-en-2-yl)-4,4a,5,6,7,8-hexahydronaphthalen-2(3H)-one (nootkatone), cinnamaldehyde, 2,6,6-trimethyl-bicyclo[3.1.1]heptane-3-spiro-2'-cyclohexen-4'-one and 3,7-dimethylocta-2,6-dienal (citral).

According to a particular embodiment of the invention the following compounds of formula (P') can be cited: the damascones, ionones, beta-damascenone, 1-(3,3- or 5,5-dimethyl-1-cyclohexen-1-yl)-4-penten-1-one, 1-(5-ethyl-5-methyl-1-cyclohexen-1-yl)-4-penten-1-one, carvone, 1-(2,2,3,6-tetramethyl-1-cyclohexyl)-2-buten-1-one, 4-(2,2,3,6-tetramethyl-1-cyclohexyl)-3-buten-2-one and citral.

Therefore, the invention's compounds capable of releasing such compounds (P'), or carrying the corresponding P group, are also a particularly appreciated embodiment of the invention.

An example of the above-mentioned decomposition reaction is illustrated in the following scheme, wherein only one repeating unit is shown:

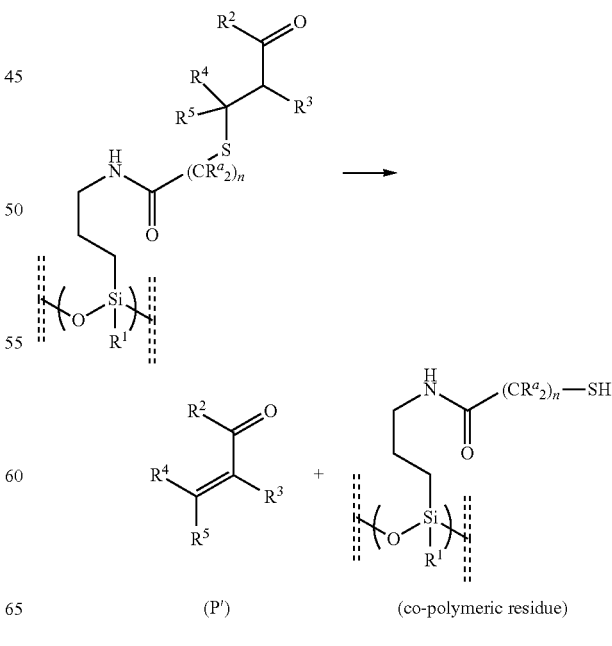

and the decomposition reaction, which leads to the release of the odoriferous molecules, is believed to be influenced by the presence of oxygen, pH changes or by heat, but may also be triggered by other types of mechanisms such as enzymes present on the skin.

The invention's polymers, have the particularity of showing a sufficient stability in application, while allowing a significant release of an odoriferous α,β-unsaturated ketone or aldehyde in a controlled manner, within several hours. Such a rapid effect is opposite to what has been observed and disclosed in the prior art systems, which are effective in a significant way only after several days.

As mentioned above, the invention concerns the use of the above-described co-polymers as perfuming ingredients. In other words it concerns a method to confer, enhance, improve or modify the odor properties of a perfuming composition or of a perfumed article, which method comprises adding to said composition or article an effective amount of at least a polymer according to the invention. By "use of an invention's polymer" it has to be understood here also the use of any composition containing said polymer and which can be advantageously employed in perfumery industry as active ingredients.

Said compositions, which in fact can be advantageously employed as perfuming ingredient, are also an object of the present invention.

Therefore, another object of the present invention is a perfuming composition comprising:
i) as perfuming ingredient, at least one invention's polymer as defined above;
ii) at least one ingredient selected from the group consisting of a perfumery carrier and a perfumery base; and
iii) optionally at least one perfumery adjuvant.

By "perfumery carrier" we mean here a material which is practically neutral from a perfumery point of view, i.e. that does not significantly alter the organoleptic properties of perfuming ingredients. Said carrier may be a liquid.

As liquid carrier one may cite, as non-limiting examples, an emulsifying system, i.e. a solvent and a surfactant system, or a solvent commonly used in perfumery. A detailed description of the nature and type of solvents commonly used in perfumery cannot be exhaustive. However, one can cite as non-limiting examples solvents such as butylene or propylene glycols, glycerol, dipropyleneglycol and its monoether, 1,2,3-propanetriyl triacetate, dimethyl glutarate, dimethyl adipate 1,3-diacetyloxypropan-2-yl acetate, diethyl phthalate, isopropyl myristate, benzyl benzoate, benzyl alcohol, 2-(2-ethoxyethoxy)-1-ethano, tri-ethyl citrate or mixtures thereof, which are the most commonly used. For the compositions which comprise both a perfumery carrier and a perfumery base, other suitable perfumery carriers than those previously specified, can be also ethanol, water/ethanol mixtures, limonene or other terpenes, isoparaffins such as those known under the trademark Isopar® (origin: Exxon Chemical) or glycol ethers and glycol ether esters such as those known under the trademark Dowanol® (origin: Dow Chemical Company), or hydrogenated castors oils such as those known under the trademark Cremophor® RH 40 (origin: BASF).

As solid carrier it is meant a material where the perfuming composition or some element of the perfuming composition can be chemically or physically bound. In general such solid carrier are employed either to stabilize the composition, either to control the rate of evaporation of the compositions or of some ingredients. The employment of solid carrier is of current use in the art and a person skilled in the art knows how to reach the desired effect. However by way of non-limiting example as solid carriers one may cite absorbing gums or polymers or inorganic material, such as porous polymers, cyclodextrines, wood based materials, organic or inorganic gels, clays, gypsum talc or zeolites.

As other non-limiting example of solid carrier one may cite encapsulating materials. Examples of such materials may comprise wall-forming and plasticizing materials, such as mono, di- or trisaccharides, natural or modified starches, hydrocolloids, cellulose derivatives, polyvinyl acetates, polyvinylalcohols, proteins or pectins, or yet the materials cited in reference texts such as H. Scherz, Hydrokolloide: Stabilisatoren, Dickungs-und Geliermittel in Lebensmitteln, Band 2 der Schriftenreihe Lebensmittelchemie, Lebensmittelqualitat, Behr's Verlag GmbH & Co., Hamburg, 1996. The encapsulation is a well-known process to a person skilled in the art, and may be performed, for instance, using techniques such as spray-drying, agglomeration or yet extrusion; or consists of a coating encapsulation, including coacervation and complex coacervation technique. As non-limiting examples one may cite in particular the core-shell encapsulation with resins of the aminoplast, polyamide, polyester, polyurea or polyurethane type or a mixture thereof (all of said resins are well known to a person skilled in the art) using techniques like phase separation process induced by polymerization, by interfacial polymerization, by coacervation or altogether (all of said techniques are have been described in the prior art), and optionally in presence of polymeric stabilizer or a cationic copolymer.

In particular, as resins one may cite the ones produced by the polycondensation of an aldehyde (e.g. formaldehyde, 2,2-dimethoxyethanal, glyoxal, glyoxylic acid or glycolaldehyde and mixtures thereof) with an amine, namely urea, benzoguanamine, glycoluryl, melamine, methylol melamine, methylated methylol melamine, guanazole and the like, as well as mixtures thereof. Alternatively one may use preformed resins alkylolated polyamines such as those commercially available under the trademark Urac® (origin: Cytec Technology Corp.), Cymel® (origin: Cytec Technology Corp.), Urecoll® or Luracoll® (origin: BASF).

In particular, as resins one may cite the ones produced by the polycondensation of a polyol, like glycerol, and a polyisocyanate, like a trimer of hexamethylene diisocyanate, a trimer of isophorone diisocyanate or xylylene diisocyanate or a Biuret of hexamethylene diisocyanate or a trimer of xylylene diisocyanate with trimethylolpropane (known with the tradename of Takenate®, origin: Mitsui Chemicals), among which a trimer of xylylene diisocyanate with trimethylolpropane and a Biuret of hexamethylene diisocyanate.

Some of the seminal literature related to the encapsulation of perfumes by polycondensation of amino resins, namely melamine based resins, with aldehydes is represented by articles such as those published by K. Dietrich et al. in Acta Polymerica, 1989, vol. 40, pages 243, 325 and 683, as well as 1990, vol. 41, page 91. Such articles already describe the various parameters affecting the preparation of such core-shell microcapsules following prior art methods that are also further detailed and exemplified in the patent literature. U.S. Pat. No. 4,396,670, to the Wiggins Teape Group Limited is a pertinent early example of the latter. Since then, many other authors and creators have enriched the literature in this field and it would be impossible to cover all published developments here, but the general knowledge in this type of encapsulation is very significant. More recent publications of pertinence, which also address suitable uses of such microcapsules, are represented for example by the article of H. Y. Lee et al. in Journal of Microencapsulation, 2002, vol.

19, pg 559-569, international patent publication WO 01/41915 or yet the article of S. Bône et al. in Chimia, 2011, vol. 65, pg 177-181.

Generally speaking, by "perfumery base" we mean here a composition comprising at least one perfuming co-ingredient.

Said perfuming co-ingredient is not a co-polymer according to the invention. Moreover, by "perfuming co-ingredient" it is meant here a compound, which is used in a perfuming preparation or composition to impart a hedonic effect. In other words such a co-ingredient, to be considered as being a perfuming one, must be recognized by a person skilled in the art as being able to impart or modify in a positive or pleasant way the odor of a composition, and not just as having an odor.

The nature and type of the perfuming co-ingredients present in the base do not warrant a more detailed description here, which in any case would not be exhaustive, the skilled person being able to select them on the basis of his general knowledge and according to intended use or application and the desired organoleptic effect. In general terms, these perfuming co-ingredients belong to chemical classes as varied as alcohols, lactones, aldehydes, ketones, esters, ethers, acetates, nitriles, terpenoids, nitrogenous or sulphurous heterocyclic compounds and essential oils, and said perfuming co-ingredients can be of natural or synthetic origin or even pro-perfumes (i.e. compounds which upon degradation liberate a perfuming ingredient). Examples of pro-perfumes have been described in the literature such as in the article published by A. Herrmann in Angewandte Chemie International Edition, 2007, vol. 46, p. 5836-5863 or in more recent work of similar type, as well as in the abundant patent literature in the field.

In particular one may cite perfuming co-ingredients which are commonly used in perfume formulations, such as:

Aldehydic ingredients: decanal, dodecanal, 2-methyl-undecanal, 10-undecenal, octanal and/or nonenal;

Aromatic-herbal ingredients: eucalyptus oil, camphor, eucalyptol, menthol and/or alpha-pinene;

Balsamic ingredients: coumarine, ethylvanillin and/or vanillin;

Citrus ingredients: dihydromyrcenol, citral, orange oil, linalyl acetate, citronellyl nitrile, orange terpenes, limonene, 1-p-menthen-8-yl acetate and/or 1,4(8)-p-menthadiene;

Floral ingredients: Methyl dihydrojasmonate, linalool, Citronellol, phenylethanol, 3-(4-tert-butylphenyl)-2-methylpropanal, hexylcinnamic aldehyde, benzyl acetate, benzyl salicylate, tetrahydro-2-isobutyl-4-methyl-4(2H)-pyranol, beta ionone, methyl 2-(methylamino)benzoate, (E)-3-methyl-4-(2,6,6-trimethyl-2-cyclohexen-1-yl)-3-buten-2-one, hexyl salicylate, 3,7-dimethyl-1,6-nonadien-3-ol, 3-(4-isopropylphenyl)-2-methylpropanal, verdyl acetate, geraniol, p-menth-1-en-8-ol, 4-(1,1-dimethylethyl)-1-cyclohexyle acetate, 1,1-dimethyl-2-phenylethyl acetate, 4-cyclohexyl-2-methyl-2-butanol, amyl salicylate, high cis methyl dibydrojasmonate, 3-methyl-5-phenyl-1-pentanol, verdyl proprionate, geranyl acetate, tetrahydro linalool, cis-7-p-menthanol, propyl (S)-2-(1,1-dimethylpropoxy)propenoate, 2-methoxynaphthalene, 2,2,2-trichioro-1-phenylethyl acetate, 4/3-(4-hydroxy-4-methylpentyl)-3-cyclohexene-1-carbaldehyde, amylcinnamic aldehyde, 4-phenyl-2-butanone, isononyle acetate, 4-(1,1-diméthyléthyl)-1-cyclohexyl acetate, verdyl isobutyrate and/or mixtures of methyl-ionones isomers:

Fruity ingredients: gamma undecalactone, 4-decanolide, ethyl 2-methyl-pentanoate, hexyl acetate, ethyl 2-methylbutanoate, gamma nonalactone, allyl heptanoate, 2-phenoxyethyl isobutyrate, ethyl 2-methyl-1,3-dioxolane-2-acetate and/or diethyl 1,4-cyclohexane dicarboxylate:

Green ingredients: 2,4-dimethyl-3-cyclohexene-1-carbaldehyde, 2-tert-butyl-1-cyclohexyl acetate, styrallyl acetate, allyl (2-methylbutoxy)acetate, 4-methyl-3-decen 5-ol, diphenyl ether, (Z)-3-hexen-1-ol and/or 1-(5, 5-dimethyl-1-cyclohexen-1-yl)-4-penten-1-one;

Musk ingredients: 1,4-dioxa-5,17-cycloheptadecanedione, pentadecenolide, 3-methyl-2-benzopyrane, (1S, 1'R)-2-[1-(3',3'-dimethyl-1'-cyclohexyl)ethoxy]-2-methylpropyl propanoate, pentadecanolide and/or (1 S, 1'R)-[1-(3',3'-dimethyl-1'-cyclohexyl)ethoxycarbonyl] methyl propanoate;

Woody ingredients: 1-(octahydro-2,3,8,8-tetramethyl-2-naphtalenyl)-1-ethanone, patchouli oil, terpenes fractions of patchouli oil, (1'R,E)-2-ethyl-4-(2',2,3'-trimethyl-3'-cyclopenten-1'-yl)-2-buten-1-ol, 2-ethyl-4-(2, 2,3-trimethyl-3-cyclopentene-1-yl)-2-buten-1-ol, methyl cedryl ketone, 5-(2,2,3-trimethyl-3-cyclopentenyl)-3-miethylpentan-2-ol, 1-(2,3,8,8-tetramethyl-1,2, 3,4,6,7,8,8a-octahydronaphthalen-2-yl)ethan-1-one and/or isobornyl acetate;

Other ingredients (e.g. amber, powdery spicy or watery): dodecahydro-3a,6,6,9a-tetramethyl-naphtho[2,1-b] furan and any of its stereoisomers, heliotropin, anisic aldehyde, eugenol, cinnamic aldehyde, clove oil, 3-(1, 3-benzodioxol-5-yl)-2-methylpropanal and/or 3-(3-isopropyl-1-phenyl)butanal.

A perfumery base according to the invention may not be limited to the above mentioned perfuming co-ingredients, and many other of these co-ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said co-ingredients may also be compounds known to release in a controlled manner various types of perfuming compounds.

According to any embodiment of the invention, a particular type of perfuming ingredient is a pro-perfume. In particular one may cite all the pro-perfumes described in WO2014/202591A1 or in WO2003/049666. Specifically one may mention all pro-perfumes of formula P—S—R$^{15}$, wherein P is a group as defined above and R$^{15}$ is a linear or branched $C_8$-$C_{20}$ alkyl group optionally comprising one or two oxygen or nitrogen atoms, such as 3-(dodecylthio)-1-[2,6,6-trimethyl-3-cyclohexen-1-yl]-1-butanone. In particular R$^{15}$ can be a linear or branched $C_8$-$C_{15}$ alkyl group.

By "perfumery adjuvant" we mean here an ingredient capable of imparting additional added benefit such as a color, a particular light resistance, chemical stability, etc. A detailed description of the nature and type of adjuvant commonly used in perfuming bases cannot be exhaustive, but it has to be mentioned that said ingredients are well known to a person skilled in the art. However, one may cite as specific non-limiting examples the following: viscosity agents (e.g. surfactants, thickeners, gelling and/or theology modifiers), stabilizing agents (e.g. preservatives, antioxidant, heat/light and or buffers or chelating agents, such as BHT), color agents (e.g. dyes and/or pigments), preservative (e.g. antibacterial or antimicrobial or antifungal or anti-irritant agents), abrasives, skin cooling agents, fixatives, insect repellants, ointments, vitamins and mixture thereof.

It is understood that a person skilled in the art is perfectly able to design optimal formulations for the desired effect by admixing the above mentioned components of a perfuming composition, simply by applying the standard knowledge of the art as well as by trial and error methodologies.

Other suitable perfumery adjuvant optionally used in combination with the polymers according to the present invention comprise tertiary amines, in particular those with high water solubility, such as triethanolamine, methyldiethanolamine, dimethylethanolamine, alkyldiethanolamines and ethoxylated alkyldiethanolamines.

According to any embodiment of the invention, a particular type of perfumery adjuvant can be selected amongst those described in WO 2012/113746, such as 5-chloro-2-methylisothiazol-3(2H)-one or 1,2-benzisothiazol-3(2H)-one, or a sulfite, such as hydrogen or sodium or potassium sulfite.

An invention's composition consisting of at least one co-polymer and at least one perfumery carrier represents a particular embodiment of the invention as well as a perfuming composition comprising at least one polymer, at least one perfumery carrier, at least one perfumery base, and optionally at least one perfumery adjuvant.

It is useful to mention here that the possibility to have, in the compositions mentioned above, more than one of the invention's polymers is important as it enables the perfumer to prepare accords, perfumes, possessing the odor tonality of various compounds of the invention, creating thus new tools for their work. The invention's polymer may also be used in the presence of other perfume delivery systems, such as capsules or profragrances.

Furthermore, an invention's polymer, or a perfuming composition comprising it, is a useful perfuming ingredient, which can be advantageously used in all the fields of modern perfumery, such as fine perfumery or functional perfumery, in particular in those applications requiring a release within hours. Indeed, the invention's compounds may be advantageously employed in perfumery to achieve a more controlled deposition, and consequent release, of odoriferous compounds. For example, the polymers according to the invention, owing to a good substantivity, a low volatility and a well-controlled release of odoriferous molecules, can be incorporated in any application requiring the effect of rapid or prolonged liberation of an odoriferous component as defined hereinabove and furthermore can impart a fragrance and a freshness to a treated surface, in particular skin, which will last over a period of hours and well beyond the rinsing and/or drying processes. Since, as mentioned above, the invention's polymers do have a very particular release time profile, which makes them particularly suitable to for fine perfumery applications or also in detergents applications as to improve the top notes (i.e. the odor impact in the first hours). In that perspective, a blend of the invention's compounds and of a prior art perfume delivery systems can allow impacting positively the whole time period of usage of a consumer product.

Consequently, a perfuming consumer product comprising, as a perfuming ingredient, at least one invention's polymer as defined above, is also an object of the present invention.

The invention's compound can be added as such or as part of an invention's perfuming composition.

For the sake of clarity, it has to be mentioned that, by "perfuming consumer product" it is meant a consumer product which is expected to deliver at least a pleasant perfuming effect to the surface to which it is applied (e.g. skin, textile, or hard surface). In other words, a perfuming consumer product according to the invention is a perfumed consumer product which comprises the functional formulation, as well as optionally additional benefit agents, corresponding to the desired consumer product, e.g. an eau de toilette, and an olfactively effective amount of at least one invention's polymer.

The nature and type of the constituents of the perfuming consumer product do not warrant a more detailed description here, which in any case would not be exhaustive, the skilled person being able to select them on the basis of its general knowledge and according to the nature and the desired effect of said product.

Non-limiting examples of suitable perfuming consumer products can be a perfume, such as a fine perfume, a splash, an eau de toilette, an eau de perfume, a cologne or an after-shave lotion; a fabric care product, such as a solid or liquid detergent or a unidose detergent (like a powder tablet, a liquid unidose or a multichamber unidose detergent), a fabric softener, a fabric refresher, an ironing water, a paper, or a bleach, carpet cleaners, curtain-care products; a body-care product, such as a hair care product (e.g. a shampoo, a coloring preparation or a hair spray, a color care product, hair shaping product), a dental care product, a disinfectant, an intimate care product; a cosmetic preparation (e.g. a skin cream or lotion, a vanishing cream or a deodorant or antiperspirant (e.g. a spray or roll on), hair remover, tanning or sun or after sun product, nail products, skin cleansing, a makeup); or a skin-care product (e.g. a perfumed soap, shower or bath mousse, oil or gel, or a hygiene product or a foot/hand care products); an air care product, such as an air freshener or a "ready to use" powdered air freshener which can be used in the home space (rooms, refrigerators, cupboards, shoes or car) and/or in a public space (halls, hotels, malls, etc.); or a home care product, such as a mold remover, furnisher care, a wipe, a dish detergent or a hard-surface (e.g. a floor, bath, sanitary or a windows) detergent; a leather care product; a car care product, such as a polish, waxes or a plastic cleaners.

Since the invention's polymers are particularly soluble in ethanol, any alcoholic perfuming consumer product is particularly suitable. According to any one of the invention's embodiments, said perfuming consumer product is a perfuming consumer product having a total amount of surfactant below 10% w/w, or even below 6% w/w, the percentage being relative to the weight of the perfuming consumer product formulation (i.e. without the packaging).

According to any one of the invention's embodiments, said perfuming consumer product is a perfume (such as a fine perfume, eau de toilette, eau de perfume, cologne, body splash, after shave lotion or body spray, body mist), or a deodorant (such as a body deodorant spray).

As mentioned above, the polymers according to the invention, can impart a fragrance and freshness to a treated surface, e.g. skin, which will last well beyond the rinsing and/or drying processes.

A further aspect of the present invention is a method to confer, enhance, improve or modify the odor properties of a surface, which method comprises depositing on said surface, or washing said surface with, an effective amount of at least one polymer according to the invention. Said surface can be any one, and one can cite as non-limiting examples, textiles, hard surfaces, hair and skin, and in particularly synthetic fibers, such as polyesters, and hair. In particular said surface is skin.

Some of the above-mentioned perfuming consumer products may represent an aggressive medium for the invention's compound, so that it may be necessary to protect the latter from premature decomposition, for example by encapsulation.

Typical examples of fabric detergents or softener compositions into which the compounds of the invention can be incorporated are described in WO 97/34986 or in U.S. Pat. Nos. 4,137,180 and 5,236,615 or EP 799 885. Other typical detergent and softening compositions which can be used are described in works such as Ullmann's Encyklopedia of Industrial Chemistry, vol. 20, Wiley-VCH, Weinheim, p. 355-540 (2012); Flick, Advanced Cleaning Product Formulations. Noye Publication, Park Ridge, N.J. (1989); Showell, in Surfactant Science Series, vol. 71: Powdered Detergents, Marcel Dekker, New York (1988); Proceedings of the World Conference on Detergents (4th, 1998, Montreux, Switzerland), AOCS print.

The proportions in which the compounds according to the invention can be incorporated into the various aforementioned products or compositions vary within a wide range of values. These values are dependent on the nature of the product to be perfumed and on the desired olfactory effect as well as the nature of the co-ingredients in a given composition when the compounds according to the invention are mixed with perfuming co-ingredients, solvents or additives commonly used in the art.

For example, typical concentrations are in the order of 0.001% to 20%, or even 10%, by weight, or even more, of the invention's compound based on the weight of the composition into which they are incorporated. Concentrations lower than these, such as in the order of 0.001% to 10%, or even 5%, by weight, can be used when this compound is applied directly in the perfuming of the various perfuming consumer products mentioned hereinabove.

Another object of the present invention relates to a method for the perfuming of a surface or to a method for intensifying or prolonging the diffusion effect of the characteristic fragrance of an odoriferous ingredient on a surface, characterized in that said surface is treated in the presence of an invention's compound. Suitable surfaces are, in particular, textiles, hard surfaces, hair and skin. In particular said surface is skin.

EXAMPLES

The invention will now be described in further detail by way of the following examples, wherein the abbreviations have the usual meaning in the art, the temperatures are indicated in degrees centigrade (° C.); the NMR spectral data were recorded in $CD_3OD$ (if not stated otherwise) on a Bruker DPX 400 spectrometer with 400 MHz for $^1H$ and 100 MHz for $^{13}C$, the chemical displacements δ are indicated in ppm with respect to the TMS as standard, the coupling constants J are expressed in Hz.

Commercially available reagents and solvents were used without further purification, if not stated otherwise. IR Spectra: Thermo Scientific Nicolet FTIR spectrometer, ν in $cm^{-1}$, data provided as position (intensity, i.e. % transmittance). Size exclusion chromatography (SEC) analyses were carried out at room temperature (ca. 22° C.) on a Viscotek GPC max VE 2001 GPC Solvent Sample Module connected to a Viscotek UV detector 2500, a Viscotek VE3580 RI detector and a Viscotek-270-Dual-Detector viscometer. Samples were eluted from Waters Styragel HR 4E and HP 5 (7.8×300 mm) columns at a flow rate of 1.0 mL $min^{-1}$ with tetrahydrofuran (THF, HPLC-grade). Universal calibrations were performed using commercial poly(styrene) standards. The polymer standard (ca. 40 mg) was accurately weighed and dissolved in THF (10 mL); then these solutions (100 μL) were injected for the calibration. For the molecular weights of the polymers determined by SEC, $M_w$ stands for "weight average molecular weight" and $M_n$ stands for "number average molecular weight". In the examples, by "conversion" we define the conversion as the ratio of the addition of perfume compound (P') on the co-polymer formed in the first step. A complete conversion corresponds to a complete addition of (P') in the final copolymer. The Hansen solubility parameter of a co-polymer was calculated from the Hansen solubility parameters of the corresponding monomers by taking into account the mole fraction of each monomer in the final co-polymer. The solubility parameter data of monomer was obtained according to Hansen Solubility Parameters in Practice HSPiP software 3rd edition 3.1.25 (2013).

In the examples, by "yield" we define the yield as the weight ratio between the mass of copolymer recovered at the end of the reaction and the expected theoretical mass of the obtained product, as a function of the conversion defined above.

Example 1

Preparation of Polymers According to the Invention
1) General Protocol for the Preparation of the Invention's Copolymers Releasing δ-Damascone (a) Random α-ethoxy-ω-ethyl-poly{(methyl(3-(2-((4-oxo-4-(2,6,6-trimethylcyclohex-3-en-1-yl)butan-2-yl)thio)acetamido)propyl)siloxane-co-(3-aminopropyl)methylsiloxane-co-dimethylsiloxane}

1. Preparation of random α-ethoxy-ω-ethyl-poly (dimethylsiloxane-co-(3-aminopropyl)methylsiloxane)

In a 50 mL round-bottomed flask, 3-aminopropyl(diethoxy)methylsilane (9.87 g, 50 mmol), diethoxydimethylsilane (1.535 g, 10 mmol) and water (1.799 g, 100 mmol) were dissolved in the presence of NaOH (0.05 g 1.25 mmol) to give a colorless solution. The reaction mixture was stirred at room temperature for 4 hours. A biphasic mixture was obtained. Ethanol and water were removed by evaporation under vacuum to give an oil. FT-IR: 790(34); 1005 (30); 1176(84); 1257 (57); 1409 (87); 1591 (86); 2923 (80) Hansen solubility parameter: 14.85 $MPa^{0.5}$ 2. Preparation of 2-((4-oxo-4-(2,6,6-trimethylcyclohex-3-en-1-yl)butan-2-yl)thio)acetic acid In a 100 mL round-bottomed flask, δ-damascone (3.33 g, 17.33 mmol), thioglycolic acid (2.47 g, 26.0 mmol), 1,8-diazabicyclo[5.4.0]undec-7-ene (DBU, 0.264 mL, 1.73 mmol) and 50 mL of THF were added under magnetic stirring. The solution was warmed to 45° C. and stirred overnight. After cooling to room temperature the mixture was concentrated to give an oil. The oil was dissolved in $CH_2Cl_2$ (50 mL). The solution was washed successively with 5% aqueous HCl (2×20 mL), pure water (2×20 mL) and brine (40 mL). The organic phase was dried over sodium sulfate and then filtered. The solvent was removed under vacuum to give an oil at a yield of 90%.

FT-IR: 577 (84); 640 (78); 689 (65); 794 (84); 895 (80); 1008 (78); 1086 (84); 1116 (76); 1153 (76); 1201 (79); 1249 (79): 1295 (73); 1366(71); 1387(80); 1456 (84); 1703 (45); 2871 (82); 2958 (79); 3018 (88)

3. Preparation of random α-ethoxy-ω-ethyl-poly{(methyl(3-(2-((4-oxo-4-(2,6,6-trimethylcyclohex-3-en-1-yl)butan-2-yl)thio)acetamido)propyl)siloxane-co-(3-aminopropyl)methylsiloxane-co-dimethylsiloxane}

In a 100 mL round-bottomed flask, the acid obtained herein above under 1).(a).2 (2.3 g, 7.03 mmol), dicyclohexylcarbodiimide (DCC, 1.615 g, 7.75 mmol), N-hydroxysuccinimide (NHS, 0.857 g, 7.30 mmol) were dissolved in 40 mL of dry $CH_2Cl_2$ under magnetic stirring. The mixture was stirred at room temperature for 6 hours. Then the co-polymer obtained herein above under 1).(a).1 (1.56 g, containing 10.545 mmol —NH2) and triethylamine (1.5 mL, 10.55 mmol) in 10 mL of $CH_2Cl_2$ were added to the solution and the mixture was stirred overnight. The obtained solution was filtered and concentrated using a rotary evaporator to yield an oil, then 80 mL of ethyl acetate were added and the solution was filtered again and washed with 50 mL of 0.01 mol % aqueous HCl. The organic phase was dried over sodium sulfate and then filtered. The solvent was removed under vacuum to give an oil (a solid after removing all the solvent).

Conversion=75-80%.

$^1$H-NMR: 5.54 (m, 1H), 5.50 (m, 1H), 5.46 (m, 1H), 4.33 (m, 2H), 3.80 (m, 2H), 3.22 (m, 1H), 2.81 (m, 1H), 2.61 (m, 1H), 2.47 (m, 1H), 2.32 (m, 1H), 2.00 (m, 1H), 1.72 (m, 1H), 1.62 (m, 2H), 1.31 (m, 31H), 1.02 (m, 3H), 0.98 (m, 3H), 0.94 (m, 31H), 0.60 (m, 2H), 0.13 (m, 3H), 0.01 (m, 3H);

$^{13}$C-NMR: 214.3 (s), 176.9 (s), 132.8 (d), 125.6 (d), 63.7 (d), 51.8 (t), 43.9 (t), 42.7 (t), 36.6 (s), 34.7 (d), 33.0 (t), 30.2 (d), 29.1 (t), 26.3 (q), 26.1 (q), 24.4 (q), 21.4 (t), 15.9 (q), −0.1 (q).

FT-IR: 689 (65); 795 (55); 894 (84); 1008 (50); 1071 (55); 1153 (86); 1211 (77); 1258 (68); 1297 (85); 1366 (78); 1387 (85); 1455 (84); 1537 (77); 1644 (63); 1705 (72); 2927 (82); 2956 (83); 3018 (95); 3295 (93)

Hansen solubility parameter: 16.79 $MPa^{0.5}$

Mw (SEC)=3880 Da. Mn=2380 Da.

(b) Random α-ethoxy-a-ethyl-poly{(methyl(3-(2-((4-oxo-4-(2,6,6-trimethylcyclohex-3-en-1-yl)butan-2-yl)thio)propanamido)propyl)siloxane-co-(3-aminopropyl)methylsiloxane-co-dimethylsiloxane}

1. Preparation of 2-((4-oxo-4-(2,6,6-trimethylcyclohex-3-en-1-yl)butan-2-yl)thio)propanoic acid In a 100 mL round-bottomed flask, 6-damascone (3.33 g, 17.33 mmol), mercaptopropanoic acid (2.85 g, 26.0 mmol), 1,8-diazabicyclo[5.4.0]undec-7-ene (DBU, 0.264 mL, 1.73 mmol) and 5 mL of THF were added under a magnetic stirring. The solution was warmed to 45° C. and stirred overnight. After cooling to room temperature the mixture was concentrated to give an oil. The oil was dissolved in $CH_2Cl_2$ (50 mL). The solution was washed successively with 5% aqueous HCl (2×20 mL), pure water (2×20 mL) and brine (40 mL). The organic phase was dried over sodium sulfate and then filtered. The solvent was removed under vacuum to give an oil at a yield of 85%.

FT-IR: 648 (81); 690 (71); 843 (83); 895 (82); 932 (82); 998 (82); 1077 (79); 1117 (86); 1154 (79); 1204 (79); 1240 (78); 1285 (79); 1367 (75); 1455 (77); 1703 (46); 2872 (82); 2958 (80); 3018 (88)

2. Preparation of random α-ethoxy-ω-ethyl-poly{(methyl(3-(2-((4-oxo-4-(2,6,6-trimethylcyclohex-3-en-1-yl)butan-2-yl)thio)propanamido)propyl)siloxane siloxane-co-(3-aminopropyl)methylsiloxane-co-dimethylsiloxane}

In a 100 mL round-bottomed flask, the acid obtained herein above under 1.(b).1. (2.53 g, 7.03 mmol), dicyclohexylcarbodiimide (DCC, 1.615 g, 7.75 mmol), N-hydroxysuccinimide (NHS, 0.857 g, 7.30 mmol) were dissolved in 40 mL of dry $CH_2Cl_2$ under magnetic stirring. The mixture was stirred at room temperature for 6 hours. Then the co-polymer obtained herein above under 1).(a).1 (1.56 g, containing 10.545 mmol —$NH_2$) and triethylamine (1.5 mL, 10.55 mmol) in 10 mL of $CH_2Cl_2$ were added to the solution and stirred overnight. The obtained solution was filtered and concentrated using a rotary evaporator to yield an oil, then 80 mL of ethyl acetate were added and the solution was filtered again and washed with 50 mL of 0.01 mol % aqueous HCl The organic phase was dried over sodium sulfate and then filtered. The solvent was removed under vacuum to give an oil (become solid after removing all the solvent).

Conversion=75%.

$^1$H-NMR: 5.54 (m, 1H), 5.50 (m, 1H), 5.46 (m, 1H), 3.43 (m, 1H), 3.20 (m, 2H), 3.01 (m, 1H), 2.94 (m, 1H), 2.63 (m, 1H), 2.46 (m, 1H), 2.31 (m, 1H), 1.98 (m, 2H), 1.77 (m, 2H), 1.70 (m, 2H), 1.38 (m, 3H), 1.28 (m, 3H), 1.02 (m, 3H), 0.98 (m, 3H), 0.93 (m, 3H), 0.59 (m, 2H), 0.14 (m, 3H), 0.01 (m, 3H);

$^{13}$C-NMR: 214.6 (s), 176.4 (s), 132.8 (d), 125.4 (d), 63.7 (d), 49.7 (t), 45.8 (t), 42.7 (t), 35.8 (s), 34.7 (d), 34.0 (d), 33.1 (d), 32.9 (t), 30.3 (q), 30.2 (t), 26.8 (q), 22.3 (q), 21.3 (q), 20.4 (t), 19.6 (q), 19.5 (q), −0.01 (q).

FT-IR: 689 (65); 797 (56); 893 (84); 1007 (50); 1073 (54); 1189 (77); 1258 (65); 1367 (75); 1452 (80); 1550 (76); 1643 (70); 1705 (74); 2929 (82); 2958 (83); 3018 (94); 3305 (94)

Hansen solubility parameter: 16.74 $MPa^{0.5}$

Mw (SEC)=3800 Da. Mn=2370 Da.

(c) Random α-trimethylsiloxane-ω-trimethylsilyl-poly{(methyl(3-(2-((4-oxo-4-(2,6,6-trimethylcyclohex-3-en-1-yl)butan-2-yl)thio)acetamido)propyl)siloxane-co-dimethylsiloxane}

1. Preparation of random α-trimethylsiloxane-ω-trimethylsilyl-poly{(methyl(3-(2-((4-oxo-44-(2,6,6-trimethylcyclohex-3-en-1-yl)butan-2-yl)thio)acetamido)propyl)siloxane-co-(3-aminopropyl)methylsiloxane-co-dimethylsiloxane}

In a 50 mL round-bottomed flask, 3-aminopropyl(diethoxy)methylsilane (4.93 g, mmol), diethoxydimethylsilane (0.764 g, 5 mmol), ethoxytrimethylsilane (3.66 g, mmol) and water (1.621 g, 90 mmol) were dissolved in the presence of NaOH (0.04 g, 1.0 mmol) to give a colorless solution. The reaction mixture was stirred at room temperature for 4 hours. A biphasic mixture was obtained. Ethanol and water were removed by evaporation under vacuum to directly give an oil.

FT-IR: 687 (67); 751 (33); 789 (35); 837 (32); 1025 (31); 1255 (57); 1410 (94); 2924 (88); 2957 (87)

Hansen solubility parameter: 13.83 $MPa^{0.5}$

2. Preparation of random α-trimethylsiloxane-ω-trimethylsilyl-poly{(methyl(3-(2-((4-oxo-4-(2,6,6-trimethylcyclohex-3-en-1-yl)butan-2-yl)thio)acetamido)propyl)siloxane-co-(3-aminopropyl)methylsiloxane-co-dimethylsiloxane}

In a 100 mL round-bottomed flask, the acid obtained herein above under 1).(a).2 (2.30 g, 7.03 mmol), dicyclohexylcarbodiimide (DCC, 1.758 g, 8.44 mmol), N-hydroxysuccinimide (NHS, 0.991 g, 8.44 mmol) were dissolved in 40 mL of dry $CH_2Cl_2$ under magnetic stirring. The mixture was stirred at room temperature for 6 hours. Then the co-polymer obtained herein above under 1).(c).1 (2.784 g, containing 12.654 mmol —NH2) and triethylamine (1.98 mL, 14.06 mmol) in 10 mL of $CH_2Cl_2$ were added to the solution and stirred for hours. The obtained solution was filtered and concentrated using a rotary evaporator to yield an oil, then 80 mL of ethyl acetate were added and the solution was stored at −20° C. for 2 hrs, and then was filtered again and washed with 50 mL of 0.01 mol % aqueous HCl. The organic phase was dried over sodium sulfate and then filtered. The solvent was removed under vacuum to give an oil (which became a viscous solid after removing all the solvent).

Conversion=80-85%.

FT-IR: 686 (64); 751 (52); 790 (50); 837 (43); 1026 (42); 1190 (83); 1255 (60); 1367 (82); 1455 (87); 1548 (78); 1644 (66); 1705 (80); 2957 (82); 3291 (94)

Hansen solubility parameter: 14.64 $MPa^{0.5}$

Mw (SEC)=1840 Da. Mn (SEC)=1290 Da.

(d) Random α-trimethylsiloxane-ω-trimethylsilyl-poly{(methyl(3-(2-((4-oxo-4-(2,6,6-trimethylcyclohex-3-en-1-yl)butan-2-yl)thio)propanamido)propyl)siloxane-co-(3-aminopropyl)methylsiloxane-co-dimethylsiloxane}

In a 100 mL round-bottomed flask, the acid obtained herein above under 1).(b).1 (2.53 g, 7.03 mmol), dicyclohexylcarbodiimide (DCC, 1.758 g, 8.44 mmol), N-hydroxysuccinimide (NHS, 0.991 g, 8.44 mmol) were dissolved in 40 mL of dry $CH_2Cl_2$ under magnetic stirring. The mixture was stirred at room temperature for 6 hours. Then the co-polymer obtained herein above under 1).(c).1 (2.784 g, containing 12.654 mmol —$NH_2$) and triethylamine (1.98 mL, 14.06 mmol) in 10 mL of $CH_2Cl_2$ were added to the solution and stirred for hours. The obtained solution was filtered and concentrated using a rotary evaporator to yield an oil, then 80 mL of ethyl acetate were added and the solution was stored at −20° C. for 2 hours, and then was filtered again and washed with 50 mL of 0.01 mol % aqueous HCl. The organic phase was dried over sodium sulfate and then filtered. The solvent was removed under vacuum to give an oil (become viscous solid after removing all the solvent).

Conversion=80-85%.

FT-IR: 688 (65); 753 (53); 793 (51); 839 (42); 1030 (43); 1190 (84); 1256 (60); 1367 (82); 1452 (85); 1551 (78); 1643 (67); 1706 (83); 2930 (86); 2957 (83); 3291 (94)

Hansen solubility parameter: 14.61 $MPa^{0.5}$

Mw (SEC)=1800 Da. Mn (SEC)=1170 Da.

(e) Random α-trimethylsiloxane-ω-trimethylsilyl-poly{(methyl(3-(2-methyl-2-((1-oxo-1-(2,6,6-trimethylcyclohex-3-en-1-yl)butan-2-yl)thio)propanamido)propyl) siloxane-co-(3-aminopropyl)methylsiloxane-co-dimethylsiloxane}

1. Preparation of 2-methyl-2-((1-oxo-1-(2,6,6-trimethylcyclohex-3-en-1-yl)butan-2-yl)thio)propanoic acid In a 100 mL round-bottomed flask, δ-damascone (3.33 g, 17.33 mmol), 2-mercapto-2-methylpropanoic acid (3.13 g, 26.0 mmol), 1,8-diazabicyclo[5.4.0]undec-7-ene (DBU, 0.264 mL, 1.73 mmol) and 50 mL of DMSO were added under a magnetic stirring. The solution was warmed to 60° C. and stirred for 12 hours. After cooling to room temperature the mixture was concentrated to give an oil. The oil was dissolved in $CH_2Cl_2$ (50 mL). The solution was washed successively with 5% aqueous HCl (2×20 mL) and brine (40 mL). The organic phase was dried over sodium sulfate and then filtered. The solvent was removed under vacuum to give an oil at a yield of 70%.

FT-IR: 645 (71); 688 (58); 717 (84); 761 (91); 799 (85); 819 (80); 843 (88); 900 (80); 931 (73); 1000 (69); 1053 (86); 1067 (85); 1082 (81); 1115 (74); 1130 (76); 1165 (64); 1192 (85); 1252 (80); 1287 (58); 1337 (80); 1366 (68); 1385 (80); 1405 (80); 1686 (48); 1706 (59); 2870 (79); 2956 (73); 3016 (85)

2. Preparation of random α-trimethylsiloxane-ω-trimethylsilyl-poly{(methyl(3-(2-methyl-2-((-oxo-1-(2,6,6-trimethylcyclohex-3-en-1-yl)butan-2-yl)thio)propanamido)propyl) siloxane-co-(3-aminopropyl)methylsiloxane-co-dimethylsiloxane}

In a 100 mL round-bottomed flask, the acid obtained herein above under 1).(e).1 (2.20 g, 7.03 mmol), dicyclohexylcarbodiimide (DCC, 1.758 g, 8.44 mmol), N-hydroxysuccinimide (NHS, 0.991 g, 8.44 mmol) were dissolved in 40 mL of dry $CH_2Cl_2$ under magnetic stirring. The mixture was stirred at room temperature for 6 hours. Then the co-polymer obtained herein above under 1).(c).1 (2.784 g, containing 12.654 mmol —$NH_2$) and triethylamine (1.98 mL, 14.06 mmol) in 10 mL of $CH_2Cl_2$ were added to the solution and stirred for hours. The obtained solution was filtered and concentrated using a rotary evaporator to yield an oil, then 80 mL of ethyl acetate were added and the solution was stored at −20° C. for 2 hours, and then was filtered again and washed with 50 mL of 0.01 mol % aqueous HCl. The organic phase was dried over sodium sulfate and then filtered. The solvent was removed under vacuum to give an oil (which became a viscous solid after removing all the solvent). Conversion=80-85%.

FT-IR: 688 (67); 753 (54); 793 (52); 840(43); 1030 (43); 1188 (84); 1256 (61); 1366 (83); 1456 (87); 1520 (80); 1645 (72); 1707 (86): 2929 (86); 2957 (83); 3325 (95)

Hansen solubility parameter: 14.59 $MPa^{0.5}$

Mw (SEC)=1500 Da. Mn (SEC)=1060 Da.

(f) Random α-trimethylsiloxane-ω-trimethylsilyl-poly{(methyl(3-(2-((4-oxo-4-(2,6,6-trimethylcyclohex-3-en-1-yl)butan-2-yl)thio)acetamido)propyl) siloxane-co-(3-aminopropyl)methylsiloxane-co-dimethylsiloxane}

1. Preparation of random α-trimethylsilyl-ω-trimethylsiloxane-poly((dimethylsiloxane-co-(3-aminopropyl)methylsiloxane)

In a 50 mL round-bottomed flask, 3-aminopropyl(diethoxy)methylsilane (4.93 g, mmol), diethoxydimethylsilane (0.764 g, 5 mmol), ethoxytrimethylsilane (1.83 g, mmol) and water (1.35 g, 90 mmol) were dissolved in the presence of NaOH (0.03 g, 0.75 mmol) to give a colorless solution. The reaction mixture was stirred at room temperature for 4 hours. A biphasic mixture was obtained. Ethanol and water were removed by evaporation under vacuum to directly give an oil.

FT-IR: 687 (67); 752 (32); 789 (32); 838 (39); 1011 (28); 1256 (57); 1410 (93); 2923 (86); 2957 (88)

Hansen solubility parameter: 14.17 MPa$^{0.5}$

2. Preparation of random α-trimethylsiloxane-ω-trimethylsilyl-poly{(methyl(3-(2-((4-oxo-4-(2,6,6-trimethylcyclohex-3-en-1-yl)butan-2-yl)thio)acetamido)propyl)siloxane-co-(3-aminopropyl)methylsiloxane-co-dimethylsiloxane}

In a 100 mL round-bottomed flask, the acid obtained herein above under 1).(a).2 (2.30 g, 7.03 mmol), dicyclohexylcarbodiimide (DCC, 1.758 g, 8.44 mmol), N-hydroxysuccinimide (NHS, 0.991 g, 8.44 mmol) were dissolved in 40 mL of dry $CH_2Cl_2$ under magnetic stirring. The mixture was stirred at room temperature for 6 hours. Then the co-polymer obtained herein above under 1).(f).1 (2.288 g, containing 12.654 mmol —$NH_2$) and triethylamine (1.98 mL, 14.06 mmol) in 10 mL of $CH_2Cl_2$ were added to the solution and stirred for 40 hours. The obtained solution was filtered and concentrated using a rotary evaporator to yield an oil, then 80 mL of ethyl acetate were added and the solution was stored at −20° C. for 2 hours, and then was filtered again and washed with 50 mL of 0.01 mol % aqueous HCl. The organic phase was dried over sodium sulfate and then filtered. The solvent was removed under vacuum to give an oil (which became a viscous solid after removing all the solvent).

Conversion=80-85%.

FT-IR: 688 (66); 754 (59); 795 (53); 841 (55); 1020 (48); 1190 (82); 1257 (63); 1367 (80); 1455 (87); 1544 (78); 1644 (66); 1705 (79); 2930 (86); 2957 (84); 3295 (94)

Hansen solubility parameter: 15.25 MPa$^{0.5}$

Mw (SEC)=2500 Da. Mn (SEC)=1400 Da.

2) General Protocol for the Preparation of the Invention's Copolymers Releasing Damascenone (a) Random α-trimethylsiloxane-ω-trimethylsilyl-poly{(methyl(3-(2-((4-oxo-4-(2,6,6-trimethylcyclohex-1,3-dien-1-yl)butan-2-yl)thio)acetamido)propyl)siloxane-co-dimethylsiloxane}

1. Preparation of 2-((4-oxo-4-(2,6,6-trimethylcyclohexa-1,3-dien-1-yl)butan-2-yl)thio)acetic acid In a 100 mL round-bottomed flask, damascenone (3.3 g, 17.33 mmol), thioglycolic acid (2.47 g, 26.0 mmol), 1,8-diazabicyclo[5.4.0]undec-7-ene (DBU, 0.264 mL, 1.73 mmol) and 50 mL of THF were added under magnetic stirring. The solution was warmed to 45° C. and stirred overnight. After cooling to room temperature the mixture was concentrated to give an oil. The oil was dissolved in $CH_2Cl_2$ (50 mL). The solution was washed successively with 5% aqueous HCl (2×20 mL), pure water (2×20 mL) and brine (40 mL). The organic phase was dried over sodium sulfate and then filtered. The solvent was removed under vacuum to give an oil at a yield of 90%.

FT-IR: 665 (76); 732 (68); 785 (83); 888 (80); 948 (81); 1019 (82); 1044 (85); 1123 (72); 1149 (66); 1172 (76); 1290 (69); 1346 (78); 1380 (79); 1398 (77); 1420 (82); 1686 (56); 1706 (58); 2921 (83); 2959 (82); 3036 (89)

2. Preparation of random trimethylsiloxane-ω-trimethylsilyl-poly{(methyl(3-(2-((4-oxo-4-(2,6,6-trimethylcyclohex-1,3-dien-1-yl)butan-2-yl)thio)acetamido)propyl)siloxane-co-(3-aminopropyl)methylsiloxane-co-dimethylsiloxane}

In a 100 mL round-bottomed flask, the acid obtained herein above under 2).(a).1 (2.21 g, 7.03 mmol), dicyclohexylcarbodiimide (DCC, 1.615 g, 7.75 mmol), N-hydroxysuccinimide (NHS, 0.857 g, 7.30 mmol) were dissolved in 40 mL of dry $CH_2Cl_2$ under magnetic stirring. The mixture was stirred at room temperature for 6 hours. Then the co-polymer obtained herein above under 1).(c).1 (2.32 g, containing 10.545 mmol —$NH_2$) and triethylamine (1.5 mL, 10.55 mmol) in 10 mL of $CH_2Cl_2$ were added to the solution and stirred overnight. The obtained solution was filtered and concentrated using a rotary evaporator to yield an oil, then 80 mL of ethyl acetate were added and the solution was filtered again and washed with 50 mL of 0.01 mol % aqueous HCl. The organic phase was dried over sodium sulfate and then filtered. The solvent was removed under vacuum to give an oil (which became a solid after removing all the solvent).

Conversion=75-80%.

FT-IR: 665 (63); 753 (55); 794 (52); 840 (46); 1026 (44); 1149 (83); 1255 (60); 1359 (82); 1398 (83); 1448 (83); 1550 (74); 1644 (61); 2928 (82); 3316 (93)

Mw (SEC)=1880 Da. Mn (SEC)=1220 Da.

Hansen solubility parameter: 14.88 MPa$^{0.5}$ (b) Random α-trimethylsiloxane-ω-trimethylsilane-poly{(methyl(3-(2-((4-oxo-4-(2,6,6-trimethylcyclohex-1,3-dien-1-yl)butan-2-yl)thio)propanamido)propyl)siloxane-co-dimethylsiloxane}

1. Preparation of 2-((4-oxo-4-(2,6,6-trimethylcyclohexa-1,3-dien-1-yl)butan-2-yl)thio)-propanoic acid In a 100 mL round-bottomed flask, damascenone (3.3 g, 17.33 mmol), 2-mercaptopropanoic acid (2.85 g, 26.0 mmol), 1,8-diazabicyclo[5.4.0]undec-7-ene (DBU, 0.264 mL, 1.73 mmol) and 50 mL of THF were added under magnetic stirring. The solution was warmed to 45° C. and stirred overnight. After cooling to room temperature the mixture was concentrated to give an oil. The oil was dissolved in $CH_2Cl_2$ (50 mL). The solution was washed successively with 5% aqueous HCl (2×20 mL), pure water (2×20 mL) and brine (40 mL). The organic phase was dried over sodium sulfate and then filtered. The solvent was removed under vacuum to give an oil at a yield of 85%.

FT-IR: 671 (77); 732 (72); 855 (83); 947 (81); 1017 (86); 1063 (82); 1123 (85); 1150 (70); 1172 (75); 1238 (77); 1285 (74); 1344 (80); 1378 (80); 1398 (80); 1453 (77); 1689 (56); 2870 (85); 2928 (83); 2960 (82); 3036 (90)

2. Preparation of random α-trimethylsiloxane-ω-trimethylsilane-poly{(methyl(3-(2-((4-oxo-4-(2,6,6-trimethylcyclohex-1,3-dien-1-yl)butan-2-yl)thio)propanamido)propyl)siloxane-co-(3-aminopropyl)methylsiloxane-co-dimethylsiloxane}

In a 100 mL round-bottomed flask, the acid obtained herein above under 2).(b).1 (2.45 g, 7.03 mmol), dicyclohexylcarbodiimide (DCC, 1.615 g, 7.75 mmol), N-hydroxysuccinimide (NHS, 0.857 g, 7.30 mmol) were dissolved in 40 mL of dry $CH_2Cl_2$ under magnetic stirring. The mixture was stirred at room temperature for 6 hours. Then the co-polymer obtained herein above under 1).(c).1 (2.32 g, containing 10.545 mmol —$NH_2$) and triethylamine (1.5 mL, 10.55 mmol) in 10 mL of $CH_2Cl_2$ were added to the solution and stirred overnight. The obtained solution was filtered and concentrated using a rotary evaporator to yield an oil, then 80 mL of ethyl acetate were added and the solution was filtered again and washed with 50 mL of 0.01 mol % aqueous HCl. The organic phase was dried over sodium sulfate and then filtered. The solvent was removed under vacuum to give an oil (which became a solid after removing all the solvent).

Conversion=75-80%.

FT-IR: 663 (64); 753 (53); 793 (50); 839 (44); 1027 (42); 1149 (84); 1255 (59); 1345 (83); 1448 (82); 1553 (74); 1643 (64); 2928. (84); 2957 (84); 3306 (94)

Hansen solubility parameter: 14.85 $MPa^{0.5}$ (c) Random α-ethoxy-ω-ethyl-poly{(methyl(3-(2-((4-oxo-4-(2,6,6-trimethylcyclohex-1,3-dien-1-yl)butan-2-yl)thio)acetamido)propyl)siloxane-co-dimethylsiloxane}

1. Preparation of random α-ethoxy-ω-ethyl-poly{(methyl(3-(2-((4-oxo-4-(2,6,6-trimethylcyclohex-1,3-dien-1-yl)butan-2-yl)thio) acetamido)propyl)siloxane-co-(3-aminopropyl)methylsiloxane-co-dimethylsiloxane}

In a 100 mL round-bottomed flask, the acid obtained herein above under 2).(a).1 (2.21 g, 7.03 mmol), dicyclohexylcarbodiimide (DCC, 1.758 g, 8.44 mmol), N-hydroxysuccinimide (NHS, 0.991 g, 8.44 mmol) were dissolved in 40 mL of dry $CH_2Cl_2$ under magnetic stirring. The mixture was stirred at room temperature for 6 hours. Then the co-polymer obtained herein above under 1).(a).1 (1.875 g, containing 12.654 mmol —$NH_2$) and triethylamine (1.98 mL, 14.06 mmol) in 10 mL of $CH_2Cl_2$ were added to the solution and stirred overnight. The obtained solution was filtered and concentrated using a rotary evaporator to yield an oil, then 80 mL of ethyl acetate were added and the solution was filtered again and washed with 50 mL of 0.01 mol % aqueous HCl. The organic phase was dried over sodium sulfate and then filtered. The solvent was removed under vacuum to give an oil (which became a solid after removing all the solvent).

Conversion=75-80%.

FT-IR: 665 (74); 735 (69); 797 (58); 892 (84); 1013 (55); 1045 (53); 1.150 (81): 1190 (79); 1240 (69); 1258 (66); 1359 (82); 1372 (81); 1398 (84); 1446 (84); 1538 (79); 1645 (63); 1738 (74); 2118 (95): 2928 (84); 2958 (87); 3305 (94)

Hansen solubility parameter: 16.61 $MPa^{0.5}$

Example 2

Evaluation of the Release of a Perfuming Ingredient from the Invention's Copolymers Incorporated into a Consumer Product (Fine Perfumery)

The invention's polymer (as obtained in Example 1.1).(b).2) (164.2 mg) was dissolved (upon heating) in ethanol (9 mL), then water (1 mL) was added. The sample (0.035 mL, corresponding to a maximum amount of delta-damascone of $9.1 \times 10^{-4}$ mmol to be released) was pipetted onto a glass plate, placed inside a headspace sampling cell (ca. 625 mL) and exposed to a constant air flow of ca. 200 mL/min. The air was filtered through active charcoal and aspirated through a saturated solution of NaCl (to ensure a constant humidity of the air of ca. 75%). During 135 min the headspace system was left equilibrating, and then the volatiles were adsorbed during 15 minutes on a clean Tenax® cartridge. The cartridges with the volatiles were thermally desorbed on a Perkin Elmer TurboMatrix ATD desorber coupled to an Agilent Technologies 7890A GC System equipped with a HP-1 capillary column (30 m, i.d. 0.32 mm, film 0.25 μm) and a flame ionization detector (FID). The volatiles were analyzed using a temperature gradient from 60° C. to 200° C. at 15° C./min. Headspace concentrations (in ng/L of air) were obtained by external standard calibration with different concentrations of the delta-damascone to be liberated. As reference samples, equimolar amounts of unmodified delta-damascone (50.4 mg, reference) and prior art 3-(dodecylthio)-1-(2,6,6-trimethyl-3-cyclohexen-1-yl)-1-butanone (described as Example 4a in WO 03/049666) (102.7 mg) were prepared and analyzed in the same way. All measurements were performed at least twice.

TABLE 1

Measured headspace concentrations of δ-damascone after 150 minutes

| Compound | Amount of δ-damascone released [ng/L] |
|---|---|
| delta-damascone | 6.2 |
| Prior art (WO 03/049666) | 3.2 |
| Polymer of Example 1 1).(b).2 | 9.2 |

The present invention's polymer released delta-damascone, within a time frame acceptable for the application. It furthermore delivered higher concentration of δ-damascone into the headspace than the prior art compound (WO 03/049666) or the unmodified damascone reference.

Example 3

Evaluation of the Release of a Perfuming Ingredient from the Invention's Copolymers Incorporated into a Consumer Product (Fine Perfumery)

The following compositions were prepared according to the table herein below. The amount of damascenone chosen for the reference corresponded to the amount of damascenone comprised in 1% of the invention's copolymer (as obtained in Example 1 2).(a).2 and 2).(c)). The rest in the reference solution (Eau de toilette, EdT) was completed with a solvent (triethyl citrate) to keep the same amount of water and ethanol. Triethyl citrate was considered to have no impact on evaporation and odor intensity and was considered as being neutral.

| Component | Composition A (weight %) | Composition B (weight %) | Reference (weight %) |
|---|---|---|---|
| Polymer of Example 1 2).(a).2 | 1 | 0 | 0 |
| Polymer of Example 1 2).(c) | 0 | 1 | 0 |
| Ethanol 96% | 88.5 | 88.5 | 88.5 |
| Damascenone | 0 | 0 | 0.25 |
| Triethyl citrate | 0 | 0 | 0.75 |
| Demineralized water | 10.5 | 10.5 | 10.5 |

Composition A and composition B were then evaluated on a blind test in a sequential monadic manner against the reference, by a panel of 8 screened and trained assessors. The latter were asked to evaluate the odor intensity perceived, on a scale of 1 to 7, from each pair of samples, i.e. that of the composition according to the invention and the reference. On the scale 1 to 7, 0 represented an inability to detect the odor and 7 represented a very strong odor.

The samples were evaluated after application on glass slides at distance zero, the glass slides having been placed on a hot plate at a constant temperature of 32° C., at different time points: time zero, 2 hours, 4 hours, 6 hours. The results of the blind tests thus carried out are based on agreement. The stronger the tendency, the more assessors agreed.

To get a directional tendency for the composition to have a stronger intensity than the reference, the difference in score X=score (A or B)−Score (ref) must be ≥0.5.

To get a strong tendency for the composition to have a stronger intensity than the reference, the difference in score X=score (A or B)−Score (ref) must be ≥0.6

The results thus obtained are reported in Table 2 herein below.

TABLE 2

Results of the blind test evaluation, after each time points at 32° C., of Compositions A and B against the reference at distance zero
Table of scores

|  | T = 0 | T = 2 H | T = 4 H | T = 6 H |
|---|---|---|---|---|
| Composition A | 2.5 | 2.4 | 2.4 | 2.8 |
| Composition B | 3.1 | 3.5 | 3.6 | 2.1 |
| Ref: EdT with Damascenone | 4.5 | 2.6 | 2.3 | 1.9 |

The experiment showed that Composition B had a directional tendency to be more intense than the reference after 2 hours and 4 hours of evaporation. Composition A had a directional tendency to be more intense than the reference after 6 hours of evaporation. Therefore the invention's copolymers released enough damascenone after 2, 4 and 6 hours to be perceived olfactively stronger than the reference.

Example 4

Evaluation of the Release of a Perfuming Ingredient from the Invention's Copolymers Incorporated into a Consumer Product (Fine Perfumery)

The following compositions were prepared according to the table herein below. The amount of delta-damascone chosen for the reference corresponded to the amount of delta damascone comprised in 1% of the invention's copolymer (as obtained in Example 1 1).(c).2 and 1).(d).1). The rest of the reference solution (Eau de toilette) was completed with a solvent (triethyl citrate) to keep the same amount of water and ethanol.

| Component | Composition D (weight %) | Composition E (weight %) | Reference (weight %) |
|---|---|---|---|
| Polymer of Example 1 1).(c).2 | 1 | 0 | 0 |
| Polymer of Example 1 1).(d) | 0 | 1 | 0 |
| δ-Damascone | 0 | 0 | 0.23 |
| Ethanol 96% | 88.5 | 88.5 | 88.5 |
| Triethyl citrate | 0 | 0 | 0.77 |
| Demineralized water | 10.5 | 10.5 | 10.5 |

The sensory evaluation was performed as described in Example 3.

TABLE 3

Results of the blind test evaluation, after each time points at 32° C., of Compositions D and E against the reference at distance zero
Table of scores

| Samples | T = 0 | T = 2 H | T = 4 H | T = 6 H |
|---|---|---|---|---|
| Composition D | 3.0 | 3.3 | 2.6 | 2.3 |
| Composition E | 2.6 | 2.4 | 2.3 | 2.6 |
| Ref: EdT with δ-Damascone | 5.4 | 2.4 | 1.8 | 1.8 |

The experiment showed that Composition D had a directional tendency to be found more intense than the reference after 4 hours of evaporation. Composition E had a directional tendency to be found more intense than the reference after 6 hours of evaporation. Therefore the invention's copolymers released enough delta damascone after 4 and 6 hours to be perceived olfactively stronger than the reference.

Example 5

Evaluation of the Release of a Perfuming Ingredient from the Invention's Copolymers Incorporated into a Consumer Product (Fine Perfumery)

The following compositions were prepared according to the table herein below. The amount of delta-damascone chosen for the reference corresponded to the amount of delta-damascone comprised in 1% of the invention's copolymer (as obtained in Example 1 1).(f).2). The rest of the reference solution (Eau de toilette) was completed with a solvent (triethyl citrate) to keep the same amount of water and ethanol.

| Component | Composition F (weight %) | Reference (weight %) |
|---|---|---|
| Polymer of Example 1 1).(f).2 | 1 | 0 |
| δ-Damascone | 0 | 0.23 |
| Ethanol 96% | 88.5 | 88.5 |
| Triethyl citrate | 0 | 0.77 |
| Demineralized water | 10.5 | 10.5 |

The sensory evaluation was performed as described in Example 3.

TABLE 4

Results of the blind test evaluation, after each time points at 32° C., of Composition F against the reference at distance zero
Table of scores

| Samples | T = 0 | T = 2 H | T = 4 H | T = 6 H |
|---|---|---|---|---|
| Composition F | 3.5 | 2.6 | 3.0 | 3.0 |
| Ref: EdT with δ-Damascone | 5.1 | 2.5 | 2.3 | 2.0 |

The experiment showed that Composition F had a directional tendency to be found more intense than the reference after 6 hours of evaporation. Therefore the invention's copolymers released enough delta-damascone after 6 hours to be perceived olfactively stronger than the reference.

The invention claimed is:

1. A polymer, capable of releasing in a controlled manner an odoriferous α, β-unsaturated ketone or aldehyde, and comprising at least one repeating unit of formula

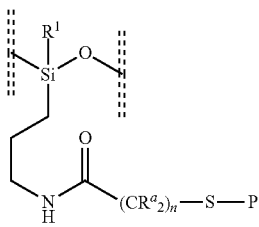
(I)

wherein the double hatched lines indicate the bonding to another repeating unit and R$^1$ represents a C$_1$ to C$_{16}$ hydrocarbon group;

P represents a group susceptible of generating a perfuming α, β-unsaturated ketone or aldehyde and is represented by formula

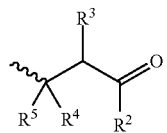
(II)

in which the wavy line indicates the location of the bond between said P and the sulfur atom;

R$^2$ represents a hydrogen atom, a C$_1$ to C$_{15}$ linear, cyclic or branched alkyl, alkenyl or alkadienyl radical, optionally substituted by one to four C$_1$ to C$_4$ alkyl groups; and R$^3$, R$^4$ and R$^5$, independently of each other, represent a hydrogen atom, a C$_6$ to C$_{10}$ aromatic ring or a C$_1$ to C$_{15}$ linear, cyclic or branched alkyl, alkenyl or alkadienyl radical, possibly substituted by C$_1$ to C$_4$ alkyl groups; or two, or three, of the groups R$^1$ to R$^4$ are bound together to form a saturated or unsaturated ring having 5 to 20 carbon atoms and, including the carbon atom to which said R$^2$, R$^3$, R$^4$ or R$^5$ groups are bound, this ring being optionally substituted by one or two C$_1$ to C$_8$ linear, branched or cyclic alkyl or alkenyl groups;

each R$^a$, independently from each other represents a hydrogen atom or a methyl group; and n represents 1 or 2.

2. The polymer of claim 1, wherein P represents a group of the formulae (P-1) to (P-13), in the form of any one of its isomers:

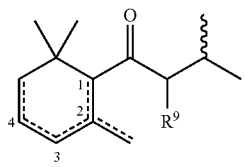
(P-1)

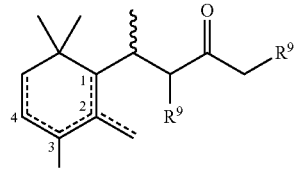
(P-2)

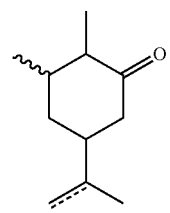
(P-3)

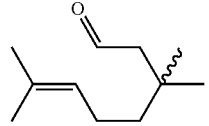
(P-4)

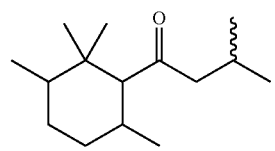
(P-5)

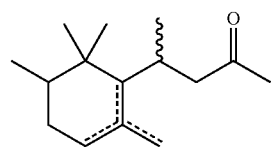
(P-6)

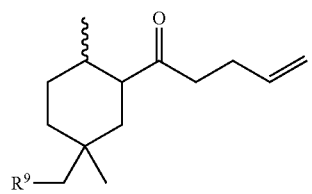
(P-7)

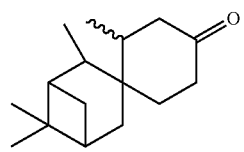
(P-8)

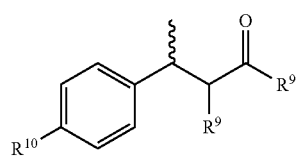
(P-9)

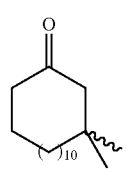
(P-10)

-continued (P-11)

(P-12)

(P-13)

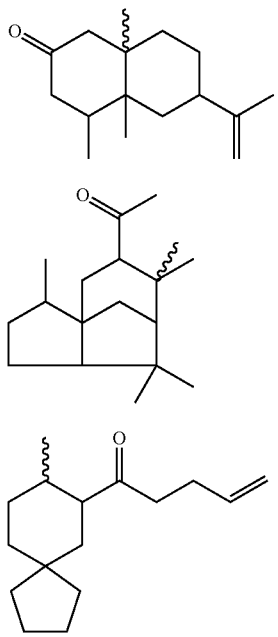

in which formulae the wavy lines have the meaning indicated above and the dotted lines represent a single or double bond, $R^9$ being a hydrogen atom or a methyl group and $R^{10}$ representing a hydrogen atom, a hydroxy or methoxy group or a $C_1$-C4 linear or branched alkyl group.

3. The polymer of claim 1, wherein said $(CR^a{}_2)_n$ group represents a group selected amongst $CH_2$, CHMe, $CMe_2$, $CH_2CH_2$, CHMeCHMe and $CHMeCH_2$.

4. The polymer of claim 1, wherein $R^1$ represents a methyl group.

5. The polymer of claim 1, further comprising at least one other repeating unit of the formulae (III), (IV) and/or (V)

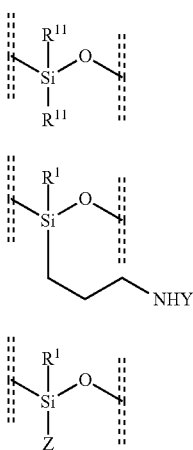

(III)

(IV)

(IV')

wherein the double hatched lines and $R^1$ have the same meaning as described in claim 1;

each $R^{11}$ group represents independently of each other a $C_6$ to $C_{12}$ aromatic ring or a $C_1$ to $C_{18}$ linear, cyclic or branched alkyl group, or a $C_1$ to $C_6$ linear, cyclic or branched alkyloxy group; and Y represents a hydrogen atom or an group of formula —(C=O)$(CR^a{}_2)_n$SH, wherein $R^a$ and n have the same meaning as in claim 1;

Z represents a group of formula —$(CH_2)_3$O—PG or —O—$(CH_2)_3$O—PG, wherein PG represent a polyglycol unit comprising between 2 and 100 glycol units.

6. The polymer of claim 5, wherein said polymer has a molar ratio of the repeating units (I)/[(III)+(IV)+(IV')] comprised between 90/10 and 40/60.

7. The polymer of claim 5, wherein said polymer is linear and comprises only siloxane units of (III), (IV), (IV') and/or (IV') formula, and of formula (I).

8. The polymer of claim 5, wherein the glycol unit has formula —$CH_2CH_2$O— or —$CH_2$CHMeO—.

9. The polymer of claim 1, wherein said polymer has a weight average molecular weight ($M_w$) comprised in the range between 1400 and 4000 Da.

10. The polymer of claim 1, wherein said polymer has a Hansen solubility parameter comprised in the range between 14.3 and 17.0 $MPa^{0.5}$.

11. A perfuming composition comprising:
i) as perfuming ingredient, at least one polymer according to claim 1;
ii) at least one ingredient comprising a perfumery carrier and/or a perfumery base; and
iii) optionally at least one perfumery adjuvant.

12. A perfuming consumer product comprising as perfuming ingredient, at least one polymer according to claim 1.

13. The perfuming consumer product of claim 12, wherein such perfuming consumer product is a perfume, a fabric care product, a body-care product, an air care product or a home care product.

14. The perfuming consumer product of claim 12, wherein the perfuming consumer product has a total amount of surfactant below 10% w/w, the percentage being relative to the weight of the perfuming consumer product formulation.

15. A method of preparing a perfuming composition, a perfuming formulation, or a perfumed article comprising utilizing the polymer of claim 1 as a perfuming ingredient in a perfuming composition, a perfuming formulation, or a perfumed article.

16. A method to confer, enhance, improve or modify the odor properties of a perfuming composition or of a perfumed article, which method comprises adding to said composition or article an effective amount of at least a polymer according to claim 1.

17. A perfuming ingredient comprising at least one polymer of claim 1.

* * * * *